United States Patent [19]
Banner et al.

[11] 3,723,713
[45] Mar. 27, 1973

[54] MASS MEASUREMENT SYSTEM FOR MASS SPECTROMETERS

[75] Inventors: Aubrey E. Banner, Sale; Thomas O. Merren, Hale, both of England

[73] Assignee: Associated Electrical Industries Limited, London, England

[22] Filed: Apr. 14, 1970

[21] Appl. No.: 28,468

[30] Foreign Application Priority Data

Apr. 15, 1969 Great Britain.....................19,199/69

[52] U.S. Cl. ..............235/151.35, 235/183, 235/196, 250/41.9 D, 307/234, 324/181, 328/161
[51] Int. Cl............................G06g 7/74, B01d 59/48
[58] Field of Search..........235/183, 184; 250/41.9 D; 328/109–112, 161; 307/232, 234; 324/403 P, 181; 343/17.1, 119, 16, 7.3

[56] References Cited

UNITED STATES PATENTS

| | | | |
|---|---|---|---|
| 2,994,822 | 8/1961 | Isley, Jr. | 328/111 X |
| 3,004,707 | 10/1961 | Wilson | 324/181 |
| 3,221,253 | 11/1965 | Keyes | 328/111 X |
| 3,312,894 | 4/1967 | Blake | 328/111 X |
| 3,345,575 | 10/1967 | Van der Lans | 328/110 X |
| 3,363,187 | 1/1968 | Hickin | 324/181 X |
| 3,370,228 | 2/1968 | Mills | 328/109 |
| 3,521,046 | 7/1970 | Le Vell Tippetts | 235/183 X |
| 3,541,318 | 11/1970 | Miller | 235/183 |

Primary Examiner—Felix D. Gruber
Attorney—Watts, Hoffmann, Fisher & Heinke

[57] ABSTRACT

In a scanning mass spectrometer, electrical output signals including a series of time-related peaks representing an ion mass spectrum of an unknown sample material are produced along with a series of reference peaks derived from a reference material. The time at which a spectrum peak occurs is taken to be the time of occurrence of the centroid (or center of gravity) of the peak. The time of occurrence of the peak centroid in relation to the time of occurrence of the end of the peak is determined and that information is presented in digital form. The occurrence time of the peak centroid is then subtracted from the occurrence time of the peak to provide the peak centroid occurrence on the scan. Thus, the time positions of the peak centroids due to an unknown sample may be readily identified with respect to the time positions of the centroids of peaks due to the reference material.

36 Claims, 9 Drawing Figures

MASS MEASUREMENT SYSTEM FOR MASS SPECTROMETERS

BACKGROUND OF THE INVENTION

1. Field of the Invention

This invention relates to mass spectrometers, and, more particularly, to a mass measurement system for a scanning mass spectrometer in which an unknown sample may be identified by the time position of its peak centroid with respect to the time position of the peak centroids of a reference material.

1. Description of the Prior Art

Mass spectrometry is a known method of testing material to ascertain its composition. In a mass spectrometer, a material being analyzed is first ionized. In one class of mass spectrometers, the ions are accelerated and then passed through an electrostatic field to a monitor collector. The ions to be analyzed pass through the monitor collector and then through a magnetic field. After the ions pass through the magnetic field, they are received by a collecting device. The coaction of the acceleration, the electrostatic field, and the monitor collector separates undesired ions from those which are to be analyzed. Analysis of the information gathered by the collecting device can identify the quality or nature of the ions which reach the collecting device.

The physical principle upon which mass spectrometers operate is that each ion has a characteristic mass/charge ratio. As the ion passes through the electrostatic and magnetic fields, it is deflected by the electrostatic charge and then by the magnetism. The amount of deflection is a function of the mass of the ion, the speed at which the ion is traveling, and the strength of its electric charge. By varying the strength of the electrostatic field or the magnetic field, ions having various mass/charge ratios are caused to impinge on the collecting device. This action of varying the strength of the electrostatic field or the magnetic field is known as scanning.

It is known to introduce a reference compound having a known mass/charge ratio into the mass spectrometer along with the unknown material to be determined. As the spectrometer scans, its electrical output from the collecting device will include a series of time-related peaks representing an ion mass spectrum of the unknown sample of material along with a series of reference peaks derived from the reference material. Thus, the positions of the peaks with respect to time due to the unknown sample may be identified.

The mass measurement may be made in several ways, one known method being that of peak matching, in which the unknown peak of interest and a suitable reference peak are alternately displayed on an oscilloscope. The accurate masses of the unknown peaks are then calculated from the accurately known masses of the reference peaks, and a knowledge of the way in which the rate of scan changes, which is itself deduced from the times of occurrence of the reference peaks.

Scanning methods may be very simple, such as those utilizing a paper chart, whereby the relative times at which the peaks occur are measured on the chart in relation to a specially provided timer trace from an accurate clock circuit. On the other hand, they can be very sophisticated and costly, involving a digital computer and a special interface connected directly on-line with the mass spectrometer.

A general object of the present invention is to provide a method and apparatus for determining the time of occurrence of the time/amplitude centroid of a pulse of similar waveform, wherein the time at which a spectrum peak occurs is taken to be the time of the centroid (or center of gravity) of the peak. The method and apparatus are readily used as an intermediate low cost approach to the requirements of mass measurement, overcoming the disadvantages of the very simple systems while maintaining the accuracy obtainable with full computer systems.

SUMMARY OF THE INVENTION

The invention is based on the fact (to be later explained in detail) that where a mass spectrometer output signal or other similar pulse-shaped waveform is a function $F(t)$, $t$ being time, and $F(t)$ is greater than a threshold value between times $t = 0$ and $t = T$, then the time of occurrence $t_c$ of the centroid of $F(t)$ is given by $t_c = T - [H(T)]1[G(T)]$, where $G(T)$ is the value of the integral with respect to time of $F(t)$ at $t = T$, and $H(T)$ is the value of the integral with respect to time of $G(t)$ at $t = T$.

Accordingly, a method of determining the occurrence time of the time/amplitude centroid of a pulse signal or other waveform, such as the output waveform of a mass spectrometer having a non-zero amplitude or an amplitude above a predetermined value for a period of time, comprises the steps of integrating the pulse signal while its amplitude exceeds a threshold amplitude to provide a first integral signal. The first integral signal is then integrated during the time that the pulse signal amplitude exceeds the threshold amplitude to provide a second integral signal. After the amplitude of the pulse signal falls below the threshold amplitude, the final value of the second integral signal is divided by the final value of the first integral signal to provide a signal representative of a period of time. That signal is then subtracted from the time at which integrating was made to cease due to the amplitude of the pulse signal falling below the threshold amplitude, thus determining the occurrence time of the time/amplitude centroid of the pulse signal or other waveform.

Apparatus for practicing the method of the invention to determine the occurrence time of the time/amplitude centroid of a pulse or similar waveform having a non-zero amplitude or an amplitude above a predetermined value for a period of time comprises first integrator means to integrate the pulse or other waveform, while its amplitude exceeds a threshold amplitude to provide a first integral. Second integrator means are provided to integrate the first integral, while the amplitude of the pulse or other waveform exceeds the threshold amplitude, to provide a a second integral. Dividing means are made operable, when integrating is made to cease due to the amplitude of the pulse or other waveform falling below the amplitude threshold, to divide the final value of the second integral by the final value of the first integral to provide a signal representative of the period of time. Subtracting means then operate to subtract that period of time from the time at which integrating was made to cease due to the amplitude of the pulse or other waveform falling below the threshold amplitude, thus providing the time of occurrence of the time/amplitude centroid of the pulse or other waveform under investigation.

Preferably, the apparatus also includes means to record and/or display an occurrence time.

Storage means may be provided between the subtracting means and the record/display means, so that where peaks occur so frequently that one occurrence time cannot be recorded or displayed before the next has been obtained, occurrence times are not lost or made inaccurate by relatively slow speed of operation of the record/display means compared with the speed of operation of the integrating, dividing and subtraction means.

More than one pair of integrating means may be provided, each pair having a different sensitivity, thereby increasing the dynamic range of the apparatus. The outputs will normally be taken from the most sensitive pair of integrating means, but, should it saturate, the next most sensitive pair of integrating means will be employed, and so on through the pairs available. Every pair of integrating means is integrating simultaneously. Selection means are preferably provided automatically to change to the outputs of another less sensitive pair upon saturation of the first pair.

The invention is particularly applicable to a scanning mass spectrometer in which, although it does not directly provide the elemental compositions of a mass spectrum, the invention nevertheless provides a relatively inexpensive method of obtaining all of the necessary information for determination of accurate masses and hence of elemental compositions.

BRIEF DESCRIPTION OF THE DRAWINGS

FIG. 1 illustrates a mass spectrometer, which includes an ion source chamber 1 into which a specimen-carrying probe 3 can be inserted and in which ions can be liberated from a specimen carried by the probe. An electrode 5, to which an accelerating voltage is applied, serves to repel these ions as a beam which passes first through an electrostatic analyzer 7, including opposed conductive plates 7P between which a potential difference is maintained, and then through an intermediate slit member 9 into a magnetic analyzer 11. In the magnetic analyzer 11, an electromagnetic coil 11C establishes a strong magnetic field directed in a direction transverse to the path of the ions, and, since the ions are charged particles, their path will be curved in the magnetic field. The deflected ions, or certain of them if different groups of ions are deflected to different degrees, pass through an adjustable slit in output means 13 and are picked up by a collector electrode 15 associated with an electron multiplier 17.

Figure 1:
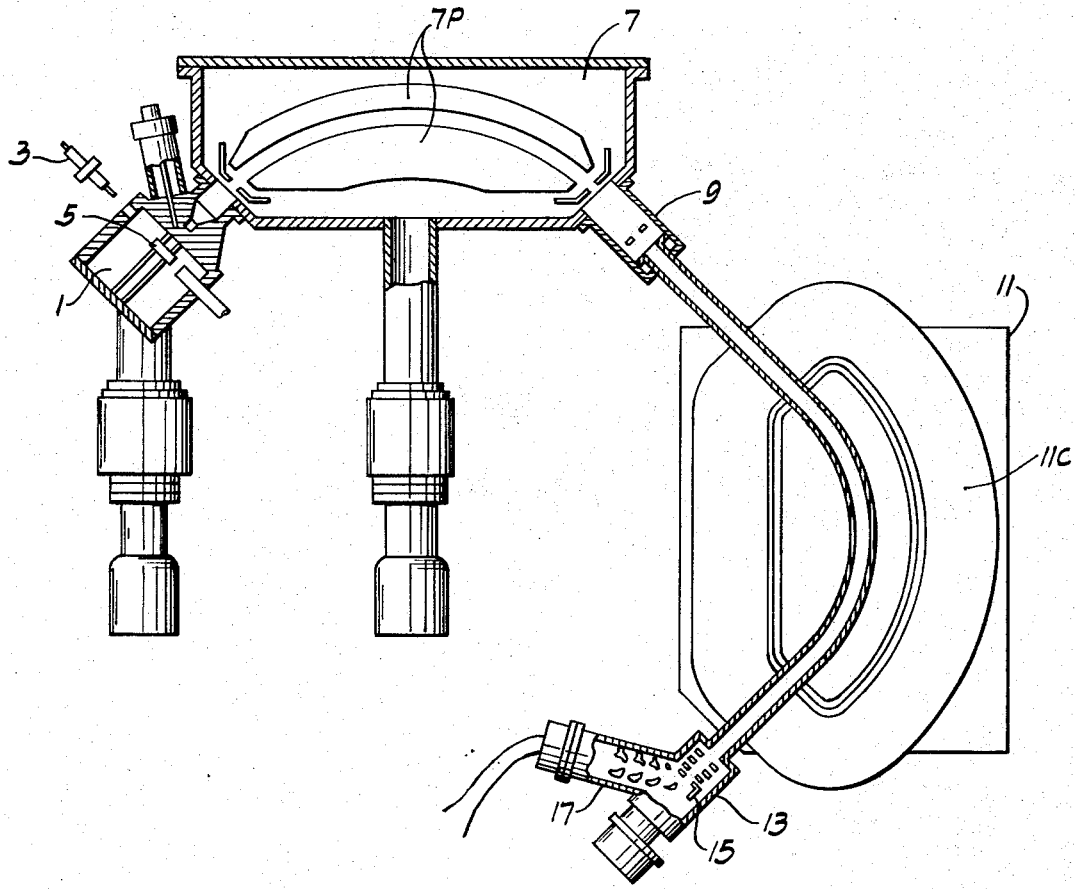
FIG. 1 is a diagrammatic sectional side elevation of one type of mass spectrometer to which the invention may be applied.

A mass spectrometer as thus far described is well known in the art, and the output from the electron multiplier 17 is used, after amplification, to provide a record of the number of ions passing through the adjustable slit in the member 13. The angular deflection of an ion in passing through the magnetic analyzer 11 will depend upon the accelerating voltage, since that determines the speed of the ions, the intensity of the field in the analyzer 11, and the mass of the ion. One method of scanning a large range of a mass spectrum is to maintain the voltages used in the electrostatic analyzer 7 and on the accelerating electrode 5 constant, and scan by varying the current used to energize the electromagnet coil 11C of the magnetic analyzer 11. This progressively changes the deflections of all the ions passing through the magnetic analyzer, so that the output from the electron multiplier 17 indicates the number of ions passing through the slitted member 13, and when presented on a cathode ray tube as the vertical deflection with a horizontal scanning speed corresponding to the decay or growth of the magnetic field in the magnetic analyzer 11, the trace shows peaks where ions having such a mass number that they are deflected to pass through the slitted member 13 are present.

In order to understand the operation of the method and apparatus of the invention, consideration of the mathematical principles involved will be helpful.

Let the input signal to the first integrator of a double integrator (two cascaded integrators) be defined as $F(t)$ between the threshold times $t = 0$ and $t = T$. The integrated signal is also a function of t, increasing continuously during the period $T$, while the signal remains above threshold. Let the value of the integral at time t be $G(t)$, $$\text{where } G(t) = \int_0^t F(t)dt.$$

The second integral is also a function of t, and is given by $H(t)$, where $$H(t) = \int_0^t G(t)dt.$$

$$\therefore H(t) = \int_0^t \left[ \int_0^t F(t)dt \right] dt.$$

Now a divider circuit determines the ratio of the final output $H(t)$ of the second integrator, at time $t = T$, to the final output $G(T)$ of the first integrator; i.e., the divider circuit gives the ratio $[H(T)]/[G(T)]$, where $$\frac{H(T)}{G(T)} = \frac{\int_0^T \left[ \int_0^t F(t)dt \right] dt}{\int_0^T F(t)dt}. \qquad (1)$$

Let the position of the peak centroid be given by $t = t_c$. Then, the equation below follows directly from the definition of the centroid with respect to the line $t = T$; that is, $$(T - t_c) \int_0^T F(t)dt = \int_0^T (T-t)F(t)dt.$$

$$\therefore t_c = T - \frac{\int_0^T (T-t)F(t)dt}{\int_0^T F(t)dt}. \qquad (2)$$

Let $I = \int_0^T (T-t)F(t)dt$.

Let $u(t) = T - t$, and let $v(t) = \int_0^t F(t)dt$ $\therefore du = -dt$, and $dv = F(t)dt$.

$\therefore I = \int_0^T u\,dv = [uv]_0^T - \int_0^T v\,du$ $\therefore I = \left[(T-t)\int_0^t F(t)dt\right]_0^T + \int_0^T \left[\int_0^t F(t)dt\right]dt$ (3)

Now $\left[(T-t)\int_0^t F(t)dt\right]_0^T = [(T-t)G(t)]_0^T$ $= 0 \cdot G(T) - T \cdot G(o)$.

Also, for all values of $t$, $F(t) \neq \infty$, and therefore $G(t) \neq \infty$. Further, $G(o) = \int_0^o F(t)dt = 0$.

$\therefore \left[(T-t)\int_0^t F(t)dt\right]_0^T = 0$. (4)

Substituting from equation (4) into equation (3), $I = \int_0^T \left[\int_0^t F(t)dt\right]dt$.

Thus, equation (2) gives $$t_c = T - \frac{\int_0^T \left[\int_0^t F(t)dt\right]dt}{\int_0^T F(t)dt}$$

Therefore, substituting from equation (1)

$t_c = T - [H(T)/G(T)]$

Hence, it follows that the time on the scan of the peak centroid is determined by subtracting the output of the divider circuit from the time on the scan of the end of the peak.

Figure 2:
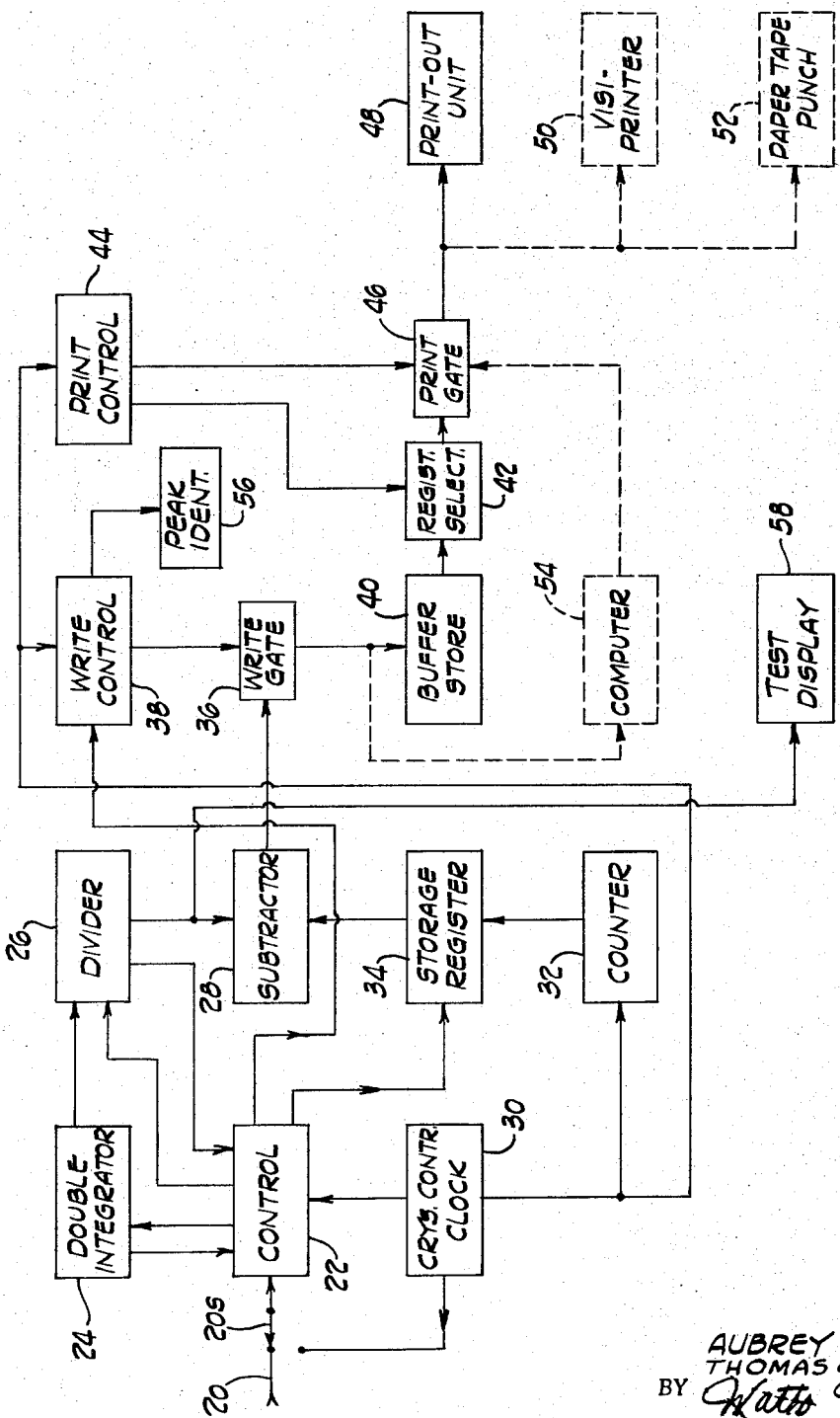
FIG. 2 is a block diagram illustrating the measurement system of the invention.

As shown in block diagram form in FIG. 2, apparatus constructed in accordance with the invention for determining the occurrence times of output peaks during a mass spectrometer scan comprises an input lead 20 for connection to the output of a mass spectrometer such as that shown in FIG. 1. The lead 20 is connected through a switch 20S into control circuitry 22, and thence into a double integrator 24 containing cascaded first and second integrating means. The double integrator 24 may contain a plurality of channels of differing sensitivities. The proper channel within the double integrator 24 is selected by means of selection means contained within the control circuitry 22 and its output is passed to dividing means 26. The selection means contained within the control circuitry 22 operates to pass to the dividing means 26 the output of the more sensitive channel in the double integrator 24, unless that channel is saturated, in which case the output of the next less sensitive channel is passed to the dividing means, and so on. Selection of the proper integrating channel in the double integrator 24 is made by a level detector (not shown) in the control circuitry 22.

In an alternative form of the apparatus, separate dividing means are provided for each channel within the double integrator 24. The connections between the integrators and the dividing means are then not dependent upon the selection means contained in the control circuitry 22. However, a different form of selection means is then used to select the output signal from the appropriate dividing means according to which channel of the double integrator 24 is in use. In either case, the output of the dividing means 26 is in digital form and is supplied as one input to subtracting means 28.

A crystal controlled clock 30 sends regular pulses to a counter 32 which serves to add the pulses. The counter 32 may be a conventional six-decade, binary-coded decimal counter, which receives a pulse from the clock 30 every 2.5 microseconds during a ten second scan of the mass spectrometer.

A threshold detector (not shown) in the controlled circuitry 22 is connected to the input lead 20, and serves to detect when the output of the mass spectrometer exceeds a threshold value. When the threshold value is exceeded, that is when the mass spectrometer output commences a peak, the threshold detector in the control circuitry 22 is triggered by the next clock pulse from the crystal controlled clock 30 and actuates the integrating means 24 to commence integration of the output of the mass spectrometer. As previously noted, a double integration is performed in the double integrating means 24, and first and second integrals of the output of the mass spectrometer are provided to the dividing means 26 from the double integrator 24.

When the output of the mass spectrometer falls below the threshold value, that is, when the peak has finished, the threshold detector in the control circuitry 22 is again triggered by the next clock pulse from the crystal controlled clock 30. This causes the integrating means 24 to cease integrating and also causes the dividing means 26 to divide the output of the second integrator (the second integral $H(T)$) by the output of the first integrator (the first integral $G(T)$). At the same time, when the threshold detector in the control circuitry 22 is triggered at the end of a mass spectrometer peak, it causes a storage register 34 to record the count state in the counter 32, thereby to record the time on the scan $T'$ at which integrating ceased. It is arranged that this recording does not affect the count state in the counter 32.

When the dividing means 26 has completed dividing the second integral by the first integral to provide a signal indicative of the period of time $[H(T)]/[G(T)]$ between the time $t_c$ of occurrence of the centroid of the output peak in the mass spectrometer and the time $T$ of cessation of integration (i.e., the end of the peak), the subtracting means 28 subtracts the period of relative time $[H(T)]/[G(T)]$ obtained from the dividing means 26 from the absolute time $T'$ count stored by the storage register 34 to give the absolute time $t'_c$ at which the centroid of the peak occurred during the mass spectrometer scan.

The output of the subtracting means 28, $t'_c = T - [H(T)]/[G(T)]$, is passed through a write gate 36 under the control of a write control circuit 38 to a buffer store 40 containing registers which store successive outputs of the subtracting means 28 until they can be printed out.

A register selector circuit 42 controlled by a print selector circuit 44 selects the registers within the buffer store 40 in the order in which the registers stored signals from the subtracting means 28, and passes these signals through a print gate 46, also under control of the print control circuit 44, to a print-out unit 48. The buffer store 40 is effective to prevent loss or distortion of the signals from the subtracting means 28, due to peaks which occur more rapidly than can be printed out by the print-out unit 48.

The print-out unit 48 may take one of several forms. For example, it may comprise a number of extra galvanometers (not shown) in an ultraviolet chart recorder used to record the mass spectra, the number of galvanometers being equal to the number of decades in the binary-coded decimal counter 32. Each binary-coded decimal counter is scanned through the four bits of data in its respective decade and the data is printed out in binary-coded decimal form as a horizontally spaced series of vertical strokes on the recorder chart paper, a long stroke, for example, representing a logical "1," and a short stroke correspondingly representing a logical "0."

To economize on the length of paper required to receive the printed out results, it is preferred that the data corresponding to successive peaks be vertically displaced alternately upwards and downwards by an amount slightly greater than the height of a long stroke to vertically stagger alternate print-outs. This avoids the necessity of leaving horizontal spaces between data groups printed on the chart paper.

An alternative form of print-out unit is shown in dashed lines at 50 and is known as a Honeywell Visiprinter, which prints out data in numerical form.

Still another alternative form of print-out unit is a paper tape punch indicated generally at 52, which enables accurate time data to be fed later to an off-line computer (not shown) which could calculate accurate masses and hence elemental compositions.

As a further alternative, the peak centroid times $t'_c$ can be taken directly from the output of the subtracting means 28 (by way of the write gate 36) and fed to an on-line computer denoted generally at 54, thus bypassing the buffer store 40. The computer can calculate the accurate masses of the substance being analyzed in the mass spectrometer, the results being printed out on the Visiprinter 50 or by the print-out unit 48. Alternatively, a very fast printer, known as a strip printer, could be used.

Some peaks will not have their centroid times calculated due to their amplitudes always being below the threshold value. Also, some centroid times may be omitted if peaks occur so frequently that the buffer store 40 is temporarily completely filled. Therefore, to avoid confusion in the results, it is preferred to identify on the recording of the mass spectrometer output those peaks whose centroid times have been determined. The identification may be made by an additional trace on the record of the results obtained, and may take the form of a short vertical stroke adjacent and aligned with the peak whose centroid time has been determined. In this case, the absence of a stroke adjacent a peak will indicate that the peak was either below threshold or that the buffer store 40 was, at the relevant time, completely filled and hence unable to accept a further centroid time. A peak identifier galvanometer 56 is provided for this purpose and is driven by an output signal from the write control circuitry 38. The derivation of that output signal will be described in detail in connection with the circuit diagram of the write control circuitry.

A simple means for calibrating the apparatus is provided by connecting a signal from the crystal controlled clock 30 through the switch 20S to the input of the control circuitry 22. With the apparatus operational, a synthetic peak constituted by a square pulse of 0.5 millisecond duration derived from the crystal controlled clock 30 is utilized. The centroid of a square pulse lies at the center of the pulse, and therefore the time $[H(T)]/[G(T)]$ between the calculated centroid time ($t_c$) of a synthetic peak and the end of the peak (T) should be 0.25 milliseconds. This may be ascertained by connecting a suitable test display 58 to the output of the dividing means 26. If the clock 30 is delivering a pulse every 2.5 microseconds to the counter 32, the test display 58 should indicate a count of one hundred. A different figure will indicate that the apparatus is incorrectly calibrated, and appropriate adjustments may be made to suitable trimming potentiometers (not shown in FIG. 1) in the double integrator 24 and in the dividing means 26. For optimum performance, synthetic peaks of various widths and heights are used, and additional adjustments are made to the trimming potentiometers in the double integrator 24 and the dividing means 26.

Figure 3A:
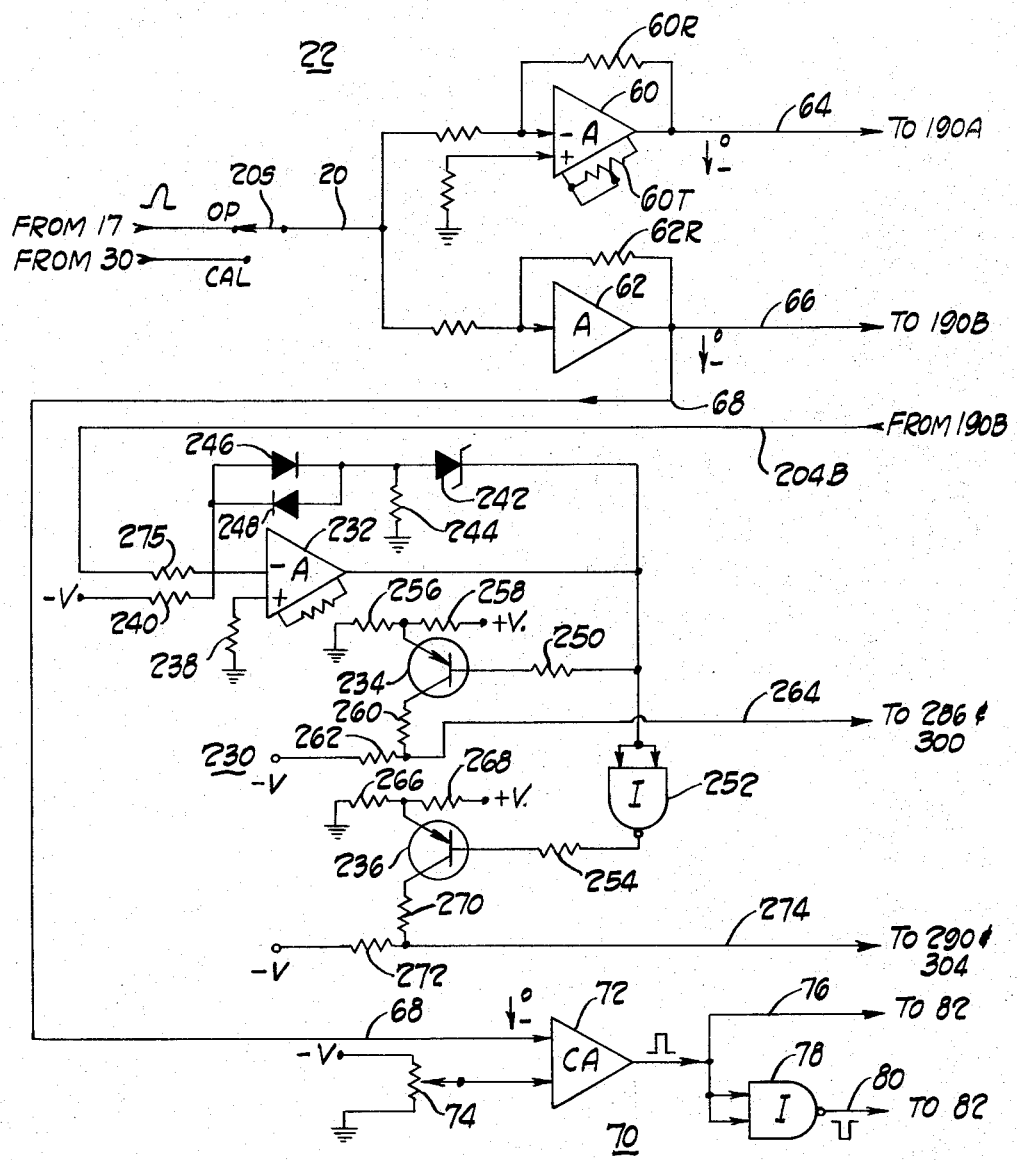
FIGS. 3a and 3b are diagrams of control circuitry shown in block form in FIG. 2.

A positive-going output signal is provided from the electron multiplier 17 of the mass spectrometer through a portion of the control circuitry 22 to the double integrator 24. That portion of the control circuitry 22 through which the input signal is passed is shown in the upper portion of FIG. 3a and comprises a pair of operational amplifiers 60, 62. The operational amplifier 60 is provided with the usual feedback resistor 60R and is arranged to operate at unity gain. The amplifier 60 also includes a trimmer potentiometer 60T. The amplifier 62 has a similar feedback resistor 62R and is arranged to operate at a gain of 100. The amplifiers 60, 62 respectively drive two channels of the double integrator, and thus obtain a dynamic range 100 times greater than could be obtained with only one channel. Output signals from the amplifiers 60, 62 are negative-going and are respectively provided on output leads 64, 66 to the double integrator 24.

The amplifiers 60, 62 are conventional in design and are obtainable commercially. For example, the amplifier 60 may consist of a Type SQ10a manufactured by and available from Philbrick/Nexus Research, Dedham, Massachusetts. The amplifier 62 may be a Model 211 amplifier available from Analog Devices, Inc., Cambridge, Massachusetts.

The output from the more sensitive amplifier 62 is also provided on a lead 68 to a level detector, shown generally by the numeral 70. The level detector 70 comprises a comparison amplifier 72 having two inputs, one of which is connected to the lead 68 and the other of which is connected to the movable arm of a potentiometer 74 that serves as a threshold control. One end of the potentiometer 74 is connected to a source of negative voltage −V (not shown), and the other end is grounded.

The comparison amplifier 72 serves to compare the level of the incoming signal appearing on the lead 68 with the threshold level set by the potentiometer 74. When the input signal on the lead 68 becomes more negative than the threshold level, the comparison amplifier 72 provides a positive-going output signal on a lead 76. The positive-going output signal from the amplifier 72 is also provided to a NAND gate 78 connected as an inverter to provide a negative-going output signal on a lead 80.

The comparison amplifier 72 is conventional in design and readily available commercially. For example, a suitable amplifier is known as the Type SN72710N and is available from Texas Instruments, Incorporated, Dallas, Texas.

Figure 3B:
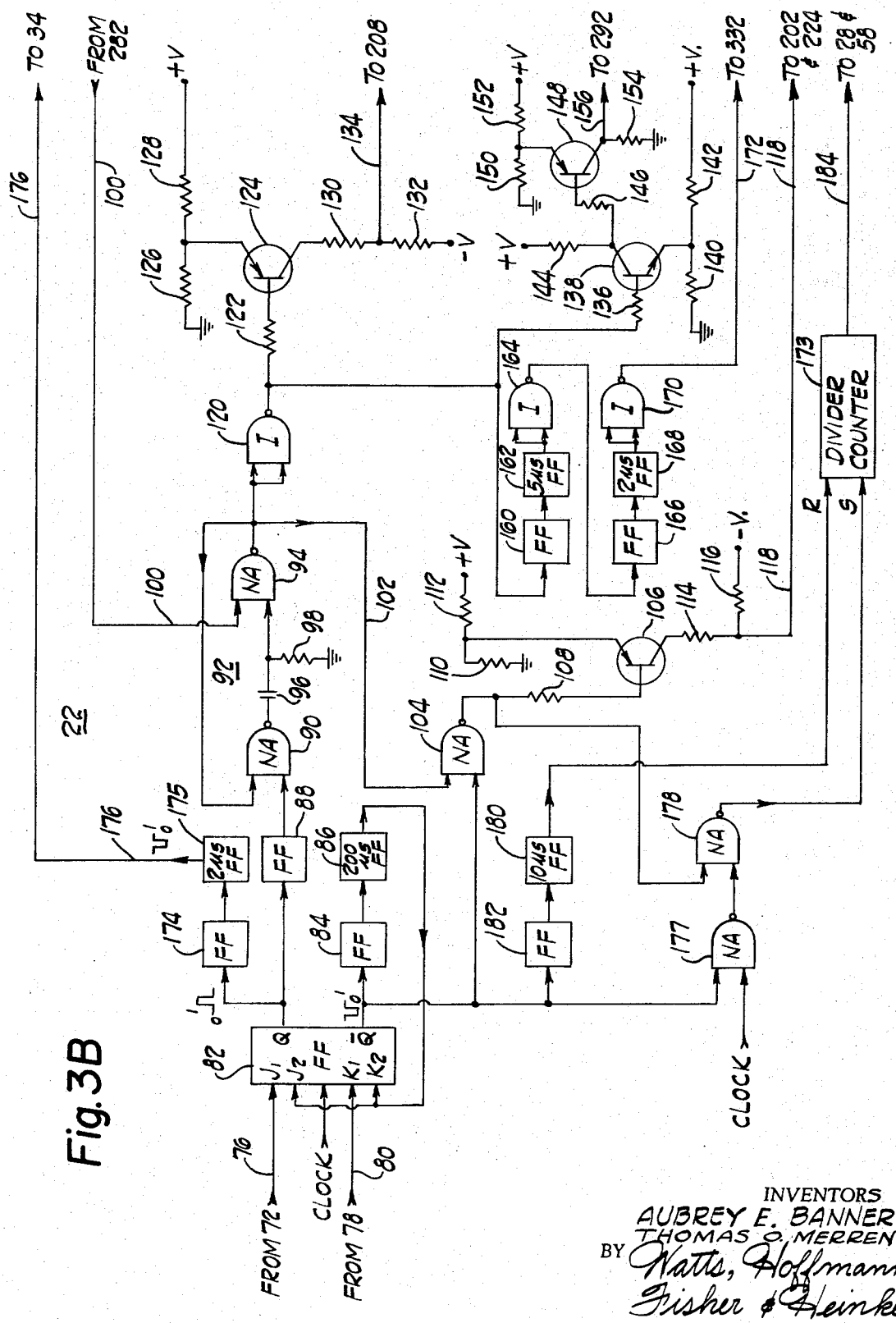

The signals on the leads 76, 80 are provided as two inputs to a digital threshold flip-flop 82 shown in FIG. 3b. Although the invention is not limited to its use, the flip-flop 82 may be a Type SN7470N, which is a member of the SN74N series of transistor-transistor logic devices supplied by Texas Instruments. This line of devices is described in a publication entitled "Semiconductor and Components Data, Book 2" obtainable from Texas Instruments. In order to provide a ready identification, the nomenclature of the various input and output leads shown in the figures of the present specification is that assigned by Texas Instruments to the SN74N series of devices.

When a positive signal appears on the lead 76 and a negative signal appears on the lead 80, indicating that the level detector has been triggered, it sets up a logical "1" on the $J_1$ input and a logical "0" on the $K_1$ input of the flip-flop 82. Throughout the specification, a logical "1" is defined as a positive signal and a logical "0" is defined as a zero potential signal. The bistable flip-flop 82 is continually clocked by clock pulses from the crystal controlled clock 30 (FIG. 2), so that on the first positive clock pulse after the level detector has operated, the flip-flop 82 switches to a logical "1" output on its direct output Q and a logical "0" on its indirect output $\overline{Q}$.

A monostable circuit comprising series-connected flip-flops 84, 86 is connected between the $\overline{Q}$ output of the flip-flop 82 and its inhibit inputs $J_2$, $K_2$ to provide a time delay of typically 200 microseconds, during which time the flip-flop 82 is inhibited to overcome problems due to statistical noise at the leading edge of the spectrum peak being analyzed.

The Q output of the flip-flop 82 is also provided through a monostable flip-flop 88 to one input of a NAND gate 90 forming part of another monostable circuit, designated generally by the numeral 92. The monostable circuit 92 also includes a second NAND gate 94, one of whose inputs is connected to the output of the NAND gate 90 through a capacitor 96 and is also connected to ground through a resistor 98. The output of the NAND gate 94 is fed back directly to a second input of the NAND gate 90. A second input of the NAND gate 94 receives a signal on a lead 100 from the dividing means 26 (FIG. 2), which will later be described in detail. The output of the NAND gate 94 is provided on a lead 102 to one input of a two-input NAND gate 104, the other input of which receives the logical "0" signal from the $\overline{Q}$ output of the flip-flop 82. Under these conditions, the output of the NAND gate 104 goes positive, and, since that output is connected to the base of a PNP transistor 106 through a resistor 108, the base of the transistor 106 goes positive.

The emitter of the transistor 106 is connected to the juncture of two resistors 110, 112 comprising a voltage divider connected between a source of direct potential +V (not shown) and ground. The collector of the transistor 106 is connected through resistors 114, 116 to the source of negative voltage −V. Thus, when the base of the transistor 106 goes positive, conduction is cut off and the collector of the transistor goes to −V. This signal is provided on a lead 118, which is connected to a juncture of the resistors 114, 116, to the double integrator 24 (FIG. 1).

The output of the NAND gate 94 in the monostable flip-flop 92 is also connected through a NAND gate 120 connected as an inverter and through a resistor 122 connected in series therewith to the base of a PNP transistor 124.

The emitter of the transistor 124 is connected to a juncture of two resistors 126, 128 connected in series between +V and ground. The collector of the transistor 124 is similarly connected to a juncture of two resistors 130, 132 connected in series between −V and the collector. The juncture of the resistors 130, 132 is connected through a lead 134 to the double integrator 24 (FIG. 1). When the Q output of the flip-flop 82 assumes a logic "1" condition, the transistor 124 conducts and provides a positive signal on the lead 134.

The output of the inverter 120 is also connected through a resistor 136 to the base of an NPN transistor 138. The emitter of the transistor 138 is connected to a juncture of two resistors 140, 142 connected in series between +V and ground, and the collector of the transistors is connected to +V through a resistor 144. The collector of the transistor 138 is also connected through a resistor 146 to the base of a PNP transistor 148. The emitter of the transistor 148 is connected to a juncture of two resistors 150, 152 connected in series between +V and ground, and the collector of that transistor is connected to ground through a resistor 154. The collector of the transistor 148 is also connected through a lead 156 to the dividing means 26 (FIG. 2).

When the transistor 106 becomes non-conductive as previously described, the transistor 124 simultaneously becomes conductive. This means that the signal on the lead 134 goes positive. The signal on the lead 156 from the transistor 148 is essentially at ground potential. This is because the output of the inverter 120 causes the transistor 138 to be non-conductive, which, in turn, causes its collector potential to rise and the transistor 148 to become non-conductive. It is also noted that the output of the inverter 120 is provided as input to delay circuitry comprising in series connection a monostable flip-flop 160, a five microsecond monostable flip-flop 162, an inverter 164, a monostable flip-flop 166, a two-microsecond flip-flop 168, and an inverter 170 that provides an output signal on a lead 172 to the write control circuitry 38 (FIG. 2).

A strobe signal is also provided from the control circuitry shown in FIG. 3b by means of a monostable flip-flop 174, whose input is connected to the Q output of the bistable flip-flop 82, and whose output is connected as input to a two microsecond monostable flip-flop 175. The output of the flip-flop 175, which consists of a negative-going pulse, is provided on a lead 176 to the storage register 34 (FIG. 2).

Signals are also provided from the control circuitry to a divider counter 173, which is actually a part of the dividing means 26 shown in FIG. 2. A set input signal to the divider counter 173 is derived from the $\overline{Q}$ output of the bistable flip-flop 82 through a two-input NAND gate 177 and a second two-input NAND gate 178. One input of the NAND gate 177 is connected to the $\overline{Q}$ output of the flip-flop 82, and the second input of that NAND gate is connected to receive clock pulses. The output of the NAND gate 177 is connected as one input to the NAND gate 178, the other input of which is taken from the output of the NAND gate 104.

A reset input of the divider counter 173 is provided with an appropriate signal from the output of a 10 microsecond monostable flip-flop 180, which is triggered by a monostable flip-flop 182. The input to the flip-flop 182 is from the $\overline{Q}$ output of the threshold flip-flop 82. The output of the divider counter 173 appears on a lead 184 and is provided as an input to the subtracting means 28 and the test display 58 shown in FIG. 2.

As previously mentioned, signals on the leads 134, 118 from the control circuitry 22 control various functions of the double integrator 24. The double integrator 24 is shown in the top portion of FIG. 4. The double integrator 24 is shown as comprising two channels denoted "A" and "B" in the drawing. Inasmuch as the two channels "A," "B" are identical in construction, only one channel will be described. The same reference numerals have been applied to corresponding parts in the two channels, those in channel "A" being followed by the suffix "A" and those in the channel "B" being followed by the suffix "B."

Each of the channels A, B, comprises three operational amplifiers 190, 192, 194. The amplifiers 190, 192, 194 may be of the Type SQ10a previously mentioned as manufactured by Philbrick/Nexus Research.

The amplifier 190 is provided with a trimmer potentiometer 196 for adjusting its zero, and with an integrating capacitor 198, the latter of which is connected between an inverting input of the amplifier and the output of the amplifier. A non-inverting input of the amplifier 190 is grounded through a resistor 200. The integrating capacitor 198 is shunted by a field effect transistor 202, whose gate electrode is connected to the lead 118 from the control circuitry shown in FIG. 3b.

The output of the amplifier 190 is connected through a lead 204 into the dividing means 26 to be later described, and through a resistor 206 and a field effect transistor 208 to an inverting input of the amplifier 192. A non-inverting input of the amplifier 192 is connected to ground through a resistor 210. The amplifier 192 is also provided with a feedback resistor 212 and with a trimmer potentiometer 214. The gate electrode of the transistor 208 is connected to the lead 134 from the transistor 124 in the control circuitry shown in FIG. 3b.

The output of the amplifier 192 is connected through a resistor 216 to an inverting input of the amplifier 194. A non-inverting input of the amplifier 194 is grounded through a resistor 218. The amplifier 194 is also provided with a trimmer potentiometer 220. The output of the amplifier 194 is connected to its inverting input through an integrating capacitor 222 connected in parallel with a field effect transistor 224. The gate electrode of the field effect transistor 224 is connected to the lead 118 from the transistor 106 in the control circuitry shown in FIG. 3b. The output of the amplifier 194 is also connected through a lead 226 into the dividing means 26 shown in the lower portion of FIG. 4.

In each of the channels A and B of the double integrator 24, the amplifier 190 serves to perform a first integration and the amplifier 194 serves to perform a second integration. Channel A integrates an input signal applied thereto on the lead 64 from the amplifier 60 in the control circuitry 22. The signal is applied through a resistor 228 to the inverting input of the amplifier 190A. Similarly, the amplifier 190B receives a signal from the amplifier 62 in the control circuitry, which signal is applied through a resistor 228B to the inverting input of the amplifier 190B. Whether or not integrations are being performed in channels A and B depends on the conductive states of the field effect transistors 202, 208, 224, which states are determined by signals from the control circuitry 22 shown in FIG. 3b.

It is particularly pointed out that the integrating capacitors 198, 222 and the feedback resistor 212 are shown merely as being representative of a plurality of such components. For example, a plurality of capacitors may be connectable in parallel with the integrating capacitor 198, a like plurality of resistors connectable in parallel with the resistor 212, and a like plurality of integrating capacitors connectable in parallel with capacitor 222. Selector switch means may be provided to select the desired integrating capacitors and feedback resistor to provide various integrating time constants for spectrometer scans of various speeds.

As previously pointed out in connection with the description of FIG. 3b, when a peak from the mass spectrometer exceeds the value determined by the threshold control, it triggers the level detector 70. This causes the digital threshold flip-flop 82 to assume a logical "1" on its Q output and a logical "0" on its $\overline{Q}$ output. This, in turn, causes a negative signal to appear on the lead 118 to the double integrator 24 and a positive signal to appear on the lead 134 to the integrator. A negative signal on the lead 118 causes the field effect transistors 202, 204 to be non-conductive, thus permitting the capacitors 198, 222 to cooperate with their respective amplifiers to perform a positive-going integration. The positive signal appearing on the lead 134 holds the transistor 208 in a conductive condition, so that the output of the amplifier 192 increases negatively as that integration in the amplifier 190 proceeds. Consequently, a positive-going integration also occurs in the integrating circuit formed by the amplifier 194 and the capacitor 222 to provide a positive-going signal on the lead 226. The integration proceeds in both channels A and B until the output of the comparison amplifier 72 in the level detector 70 reverts to a logical "0" on its output, which occurs when the spectrum peak being analyzed falls below the threshold.

When the Q output of the flip-flop 82 goes to logical "0," it triggers the monostable flip-flop 92, which produces an output pulse having a duration of approximately 150 microseconds. This causes the transistor 124 to become non-conductive and provide a negative signal on the lead 134. That negative signal causes the field effect transistor 208 in the integrator 24 to become non-conductive and further integration in the amplifier 194 is prevented.

The 150 microsecond pulse from the flip-flop 92 is also applied through the gate 104 to the transistor 106. At that time, the gate 104 is receiving a logical "0" signal from the flip-flop 92 and a logical "1" signal from the $\overline{Q}$ output of the flip-flop 82. Therefore, the output of the gate 104 remains at logical "1," thus maintaining the transistor 106 in a non-conductive state and the transistors 202, 224 in the integrator 24 in a non-conductive state. It is during this time that the division process occurs in the dividing means 26.

The channel selector, which is part of the control circuitry 22, provides signals to the dividing means 26 that determine which of the output signals from the channels A or B in the double integrator 24 are to be acted upon by the dividing means. The channel selector is designated generally by the numeral 230 and is shown in the center part of FIG. 3a.

The channel selector 230 comprises an operational amplifier 232 and a pair of PNP transistors 234, 236. The amplifier 232 may conveniently be the Type SQ10A previously mentioned, and is connected as a level detector. To this end, a non-inverting input of the amplifier 232 is connected to ground through a resistor 238 and an inverting input is connected to $-V$ through a resistor 240. The output of the amplifier 232 is connected to the cathode of a Zener diode 242, whose anode is connected to ground through a resistor 244 and to the inverting input of the amplifier through a pair of oppositely poled diodes 246, 248. The output of the amplifier 232 is also connected through a resistor 250 to the base of the PNP transistor 234 and through an inverter 252 and a resistor 254 to the base of the transistor 236. The emitter of the transistor 234 is connected to a juncture between two resistors 256, 258, which are connected in series between +V and ground. The collector of the transistor 234 is connected to a negative supply source through series-connected resistors 260, 262, and a juncture of those resistors is connected to an output lead 264. The emitter of the transistor 236 is connected to a juncture between two resistors 266, 268 connected in series between +V and ground. The collector of the transistor 236 is connected to a negative supply source through series-connected resistors 270, 272, and a juncture of those resistors is connected to an output lead 274.

In operation, the level detector amplifier 232 examines the output of the amplifier 190B in the channel B (the more sensitive channel) in the double integrator 24, which output is connected to the inverting input of the amplifier 232 through a resistor 275. It will be recalled that the output of the amplifier 190B is a positive-going signal when an integration is being performed. If the output of the amplifier 190B is not greater than, for example, +10 volts, the output of the amplifier 232 in the channel selector is at a logical "1." This causes the transistor 234 to be non-conductive, and the transistor 236 to be conductive. Thus, a negative voltage signal appears on the lead 264, and an approximately zero voltage signal appears on the lead 274.

On the other hand, when the output of the integrating amplifier 190B exceeds +10 volts, the output of the level detector amplifier 232 goes to a logical "0." This causes the transistor 234 to become conductive and provide an approximately zero voltage signal on the output lead 264. At the same time, the transistor 236 becomes non-conductive, and provides a negative voltage signal on the output lead 274.

Figure 4:
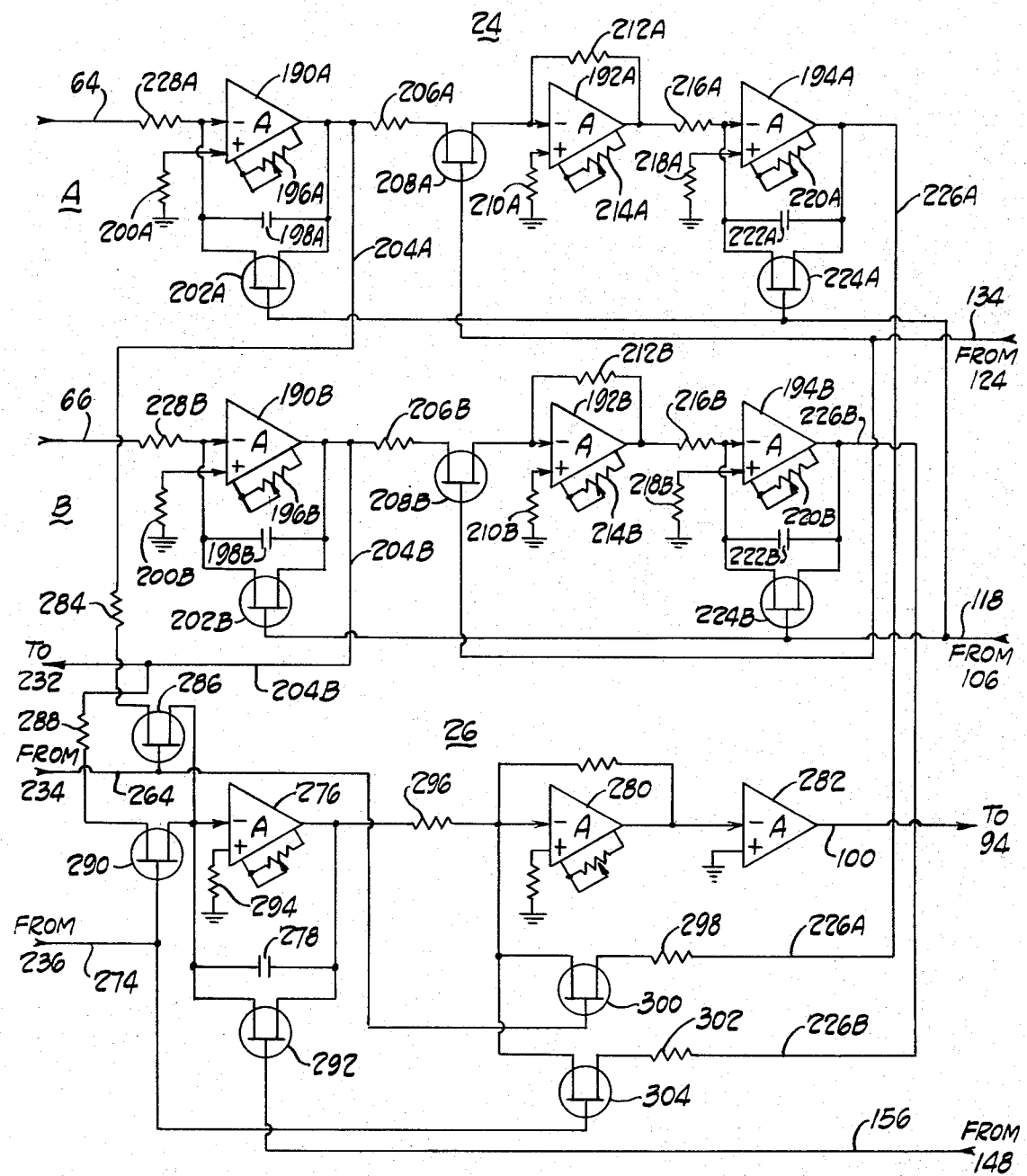
FIG. 4 is a diagram showing two pairs of integrators and a divider incorporated in the block diagram of FIG. 2.

The dividing means 26 which provides for dividing the second integrated output of the double integrator 24 by the first integrated output is shown in the lower portion of FIG. 4. It comprises an integrating amplifier 276 provided with an integrating capacitor 278, an inverting operational amplifier 280 and a fast comparison amplifier 282, which is arranged to trigger at "0" volts input. The amplifiers 276, 280 may be of the SQ10A type previously referred to, and the amplifier 282 may be of the SN72710N type also previously mentioned.

An inverting input to the integrating amplifier 276 is connected to receive either a signal from the lead 204A through a resistor 284 and a field effect transistor 286, or a signal from the lead 204B through a resistor 288 and a field effect transistor 290. Which of the field effect transistors 286, 290 is conductive to provide a signal to the input of the integrating amplifier 276 depends on the signal respectively applied to the gate electrode of those transistors on the leads 264, 274. If the signal on the lead 204B is not greater than +10 volts, the transistor 290 will be conductive to provide the signal from channel B of the integrator 24 to the dividing means. On the other hand, if the signal on the lead 204B is greater than 10 volts, the field effect transistor 286 will be made conductive to apply the signal from the channel A in the integrator to the divider. The integrating capacitor 278 is shunted by a field effect transistor 292, which must be in a non-conductive state for the integrating amplifier 276 to be operational regardless of which signal is applied to its inverting input. A non-inverting input of the amplifier 276 is grounded through a resistor 294. A signal is applied to the gate electrode of the transistor 292 from the control circuitry on the lead 156 from the transistor 148.

The output of the integrating amplifier 276 is supplied through a resistor 296 to an inverting input of the amplifier 280. The inverting input of the amplifier 280 is also connected to receive a signal from the output of the integrating amplifier 194A on the lead 226A, connected through a resistor 298 and a field effect transistor 300. The gate electrode of the transistor 300 is also connected to the lead 264 from the channel selector 230 shown in FIG. 3a. The inverting input of the amplifier 280 is similarly connected to receive a signal from the integrating amplifier 194B on the lead 226B, connected through a resistor 302 and another field effect transistor 304. The gate electrode of the transistor 304 is also connected to the lead 274 from the channel selector 230. The output of the inverting amplifier 280 is connected directly to an inverting input of the comparison amplifier 282. A non-inverting input of the amplifier 282 is connected directly to ground. The output of the amplifier 282 is connected to the lead 100 into the control circuitry shown in FIG. 3b.

It can be shown mathematically that the dividing means 26 is capable of dividing the final output $H(T)$ of the second integrator by the final output $G(T)$ of the first integrator, taking a new time origin ($t=0$) at the end of the input peak.

First, let $J(T)$ be the output of the amplifier 276 at time $t$, the input resistance being R and the capacitance being C.

Then, $J(t) = [G(T)]/(RC) \cdot t$.

The integration proceeds until $J(t)$ is equal to $H(I)$, say at time $T'$. At this time, the output of the comparison amplifier 282 inhibits the transmission of clock pulses to the divider counter 173, as will be explained later.

Therefore, $T' = RC \cdot [H(T)]/[G(T)]$ and the count is proportional to $H(T)/G(T)$. This is accomplished by the dividing means 26 operating in conjunction with the control circuitry 22 shown in FIG. 3b.

At the beginning of a spectrum peak, when the $\bar{Q}$ output of the threshold flip-flop 82 goes to a logical "0," the monostable circuit comprising the flip-flops 180, 182 applies a pulse of about 10 microseconds duration to the reset input of the divider counter 173 to reset the counter to "0." The logical "0" on the $\bar{Q}$ output of the flip-flop 82 also inhibits the NAND gate 177 and thus prevents clock pulses from reaching the divider counter through the NAND gate 178. At the end of the spectrum peak, the Q output of the flip-flop 82 assumes a logical "0" and the $\bar{Q}$ output assumes a logical "1." Thus, the NAND gate 177 is enabled to pass clock pulses to the NAND gate 178.

During the reception of a spectrum peak, the output of the gate 94 in the 150 microsecond delay circuit 92 is normally at logical "1." This causes the transistor 138 to be non-conducting, which in turn, causes the transistor 148 to be non-conducting and the output lead 156 to be at 0 volts. This causes the transistor 292 across the integrating amplifier 276 to be conducting so that no integration occurs in the amplifier 276. However, at the end of the spectrum peak, the output of the comparison amplifier 282 is at logical "1," which enables the gate 94. Thus, when the threshold flip-flop 82 triggers the 150 microsecond monostable circuit 92 at the end of the spectrum peak, the transistor 292 in the dividing means 26 becomes non-conductive and a negative-going integration commences in the integrating amplifier 276. The input to the amplifier 276 is the final output of the integrating amplifier 190A or the amplifier 190B according to the spectrum size peak. As the integration proceeds in the amplifier 276, the output of the inverting amplifier 280 increases from a negative value toward zero volts. When the integrated output of the amplifier 276 equals the output of the amplifier 194A or 194B, the comparison amplifier 282 switches from a logical "1" on its output to a logical "0," thus inhibiting the gate 94 whose output goes to a logical "1." However, the $\bar{Q}$ output of the threshold flip-flop 82 is already at logical "1," and so the output of the gate 104 switches to logical "0." This inhibits the gate 178, thus cutting off the train of clock pulses to the divider counter 173, the count state of which is then held until the next peak arrives. As has previously been shown, the count state of the divider counter 173 at this point is representative of the time of the spectrum peak centroid from the end of the peak.

When the output of the comparison amplifier 282 switches to logical "0" upon completion of the division process, and the output of the gate 104 consequently also goes to logical "0," the transistor 106 becomes conductive. This causes the collector of that transistor to go to approximately zero volts, which thus makes the field effect transistors 202, 224 in the double integrator 24 become conductive. This resets the intetrating amplifiers 190, 194 to zero volts on their outputs. Also, upon completion of the division process, when the output of the gate 94 goes to logical "1," the transistor 124 becomes conductive. This causes the signal on the lead 134 to switch to approximately zero volts and causes the transistor 208 to conduct in readiness for reception of the next spectrum peak.

As previously mentioned in connection with FIG. 2, an output of the crystal controlled clock 30 is provided to a counter 32. The output of the counter 32 is supplied through a storage register 34 to the subtractor 28. The subtractor also receives a signal from the dividing means 26, specifically from the divider counter 173, which signal is also provided to the test display 58. Neither the subtractor 28, the crystal controlled clock 30 the counter 32 or the storage registers 34 are shown in other than block forms, inasmuch as they are all conventional well-known components. For example, typical circuits that may be used for these components are shown in a book entitled, "Pulse, Digital and Switching Waveforms" by Millmau & Taub (McGraw-Hill Book Company, 1965).

The test display 58 consist of any conventional well-known device such as neon tubes, Nixie tubes (Burroughs Corporation).

The centroid time data of successive peaks which are presented successively at the output of the binary-coded decimal subtractor 28, are written in order into the buffer registers 40 under control of the write control circuitry 38 and the write gate 36. The write control and gate circuitry is shown in logical diagram form in FIG. 5.

Figure 5:
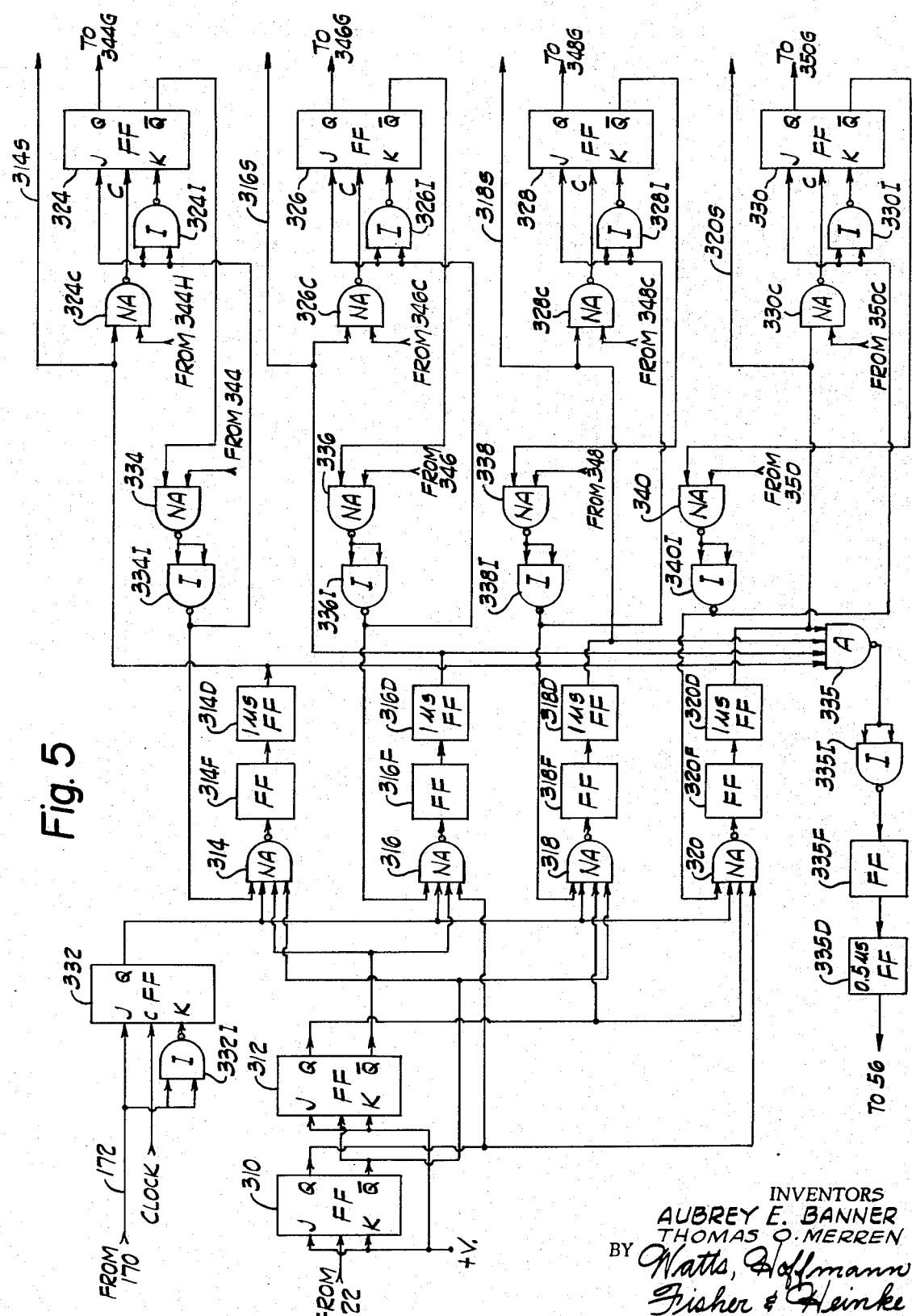
FIG. 5 is a diagram of the write circuitry of the invention.

Fundamentally, the write control 38 comprises a conventional binary counter shown in FIG. 5 as two flip-flops 310, 312, plus associated decoding gates. This arrangement provides four individual count states, each one corresponding to an associated storage register in the buffer store 40. If more than four registers are used, then the binary counter would need to be extended accordingly. For example, the use of three flip-flops in the binary counter would allow for eight registers in the buffer store. The flip-flops 310, 312 can conventionaly be Type SN7470N devices supplied by Texas Instruments, as previously mentioned. The decoding gates comprise four four-input NAND gates 314, 316, 318, 320 of conventional design.

The J and K input of both of the flip-flops 310, 312 are connected to +V, so that those flip-flops act strictly as counters. The Q output of the first flip-flop 310 is connected to one of the inputs of each of the NAND gates 316, 320, and so the $\bar{Q}$ output that flip-flop is connected to one of the inputs of the other two NAND gates, namely the gates 314, 318. The $\bar{Q}$ output of the first flip-flop 310 is also connected to the clock input of the second flip-flop 312. The Q output of the flip-flop 312 is connected as one input to each of the NAND gates 318, 320, and so the $\bar{Q}$ output of the flip-flop 312 is connected to one of the inputs of each of the NAND gates 314, 316. Thus, the counter comprising the flip-flops 310, 312 selects one of the four decoding gates 314, 316, 318, 320 by applying a logical "1" to two of its inputs. The third input to each of the gates 314–320 is provided from an associated flip-flop, respectively designated 324, 326, 328, 330, each of which is associated with a respective storage register in the buffer store 40. The purpose of the flip-flops 324–330 is to provide "flag" signals on their Q outputs to indicate whether or not data is already stored in the corresponding register. The flip-flops 324–330 may also conveniently be of the SN740N Type previously described.

The $\bar{Q}$ output of each of the flip-flops 324–330 is connected to the third input of its associated NAND gate 314–320 through a NAND gate and an inverter connected in series. The $\bar{Q}$ output of the flip-flop 324 is connected to one input of a NAND gate 334 whose output is connected through an inverter 334I to the NAND gate 314. The output of the inverter 334I is also connected directly to the J input of the flip-flop 324 and through an inverter 324I to the K input of that flip-flop. The clock input to the flip-flop 324 is provided from the output of a NAND gate 324C, one of whose inputs is a slightly delayed output of the NAND gate 314. This is caused by the output of the NAND 314 being connected to trigger a flip-flop 314F whose output in turn triggers a one microsecond delay flip-flop 314D. The other input to the NAND gate 324C is from the print control circuit 44. The Q output of the flip-flop 324 is provided to the print control circuit 44.

Inasmuch as the pattern of numbering the components in the other three channels of the write control circuitry follows that just described with respect to the first channel, and the components of the four channels are identical, the connections of the components of the remaining three channels will not be described in detail. The components of the various channels are assigned different reference numerals although the same pattern is followed, because, in some cases, they receive signals from different places in the print control circuitry.

A fourth input is provided to each of the NAND gates 314–320 from a Q output of flip-flop 332, which again may be a Type 7470N circuit available from Texas Instruments. A J input to the flip-flop 332 is provided on a lead 172 from the inverter 170 in the control circuitry 22. A K input to the flip-flop 332 is also provided from the lead 172 after it passes through an inverter 332I. The signal present on the lead 172 from the control circuitry 22 is a rough command pulse which is derived basically from the returning edge of the pulse derived from the threshold flip-flop 82 after a suitable time delay. The flip-flop 332 produces a write command pulse when the flip-flop is triggered by a command pulse applied on its C input from the crystal controlled clock.

In operation, if there is no data already present in the selected register, the output of the selected decoding gate 314–320 switches to a logical "0." This triggers its associated monostable circuit 314D–320D and applies a trigger pulse to the associated flag flip-flop 324–330. Thus, the affected flag flip-flop provides a logical "1" on its direct output Q. This signal is connected into the print control circuitry, as will be later described.

The output from each of the monostable circuits 314D–320D is connected to a respective output lead 314S–320S, which is connected to a respective data strobe input of the storage registers, whereby the data then present on the data inputs to the storage register is copied into the selected register. Since the flag has been put up by the associated flag flip-flop 324–330, it is then impossible because of the inhibited input to the corresponding decoding gate 314–320 to write any new data into the register until the then present data has been printed out and the flag signal removed.

The outputs of each of the delay flip-flops 314D–320D are connected to different inputs of a four-input NAND gate 335. The output of the NAND gate 335 is connected through an inventer 335I and thence through a flip-flop 335F and a 0.5 microsecond delay flip-flop 335D to the peak identifier galvanometer 56 shown in FIG. 2.

Whenever one of the monostable circuits 314D–320D following the decoding gates 314–320 is triggered by a write command pulse, then the delay circuit 335D is triggered to cause the peak identified galvanometer 56 to be deflected. If the selected store already contains information not yet printed out, then no pulse is obtained from the corresponding decoding gate 314–320, and consequently the peak identifier galvanometer is not deflected. It is, therefore, clear on the record which peaks have been handled by the circuitry embodying the invention.

Figure 6:
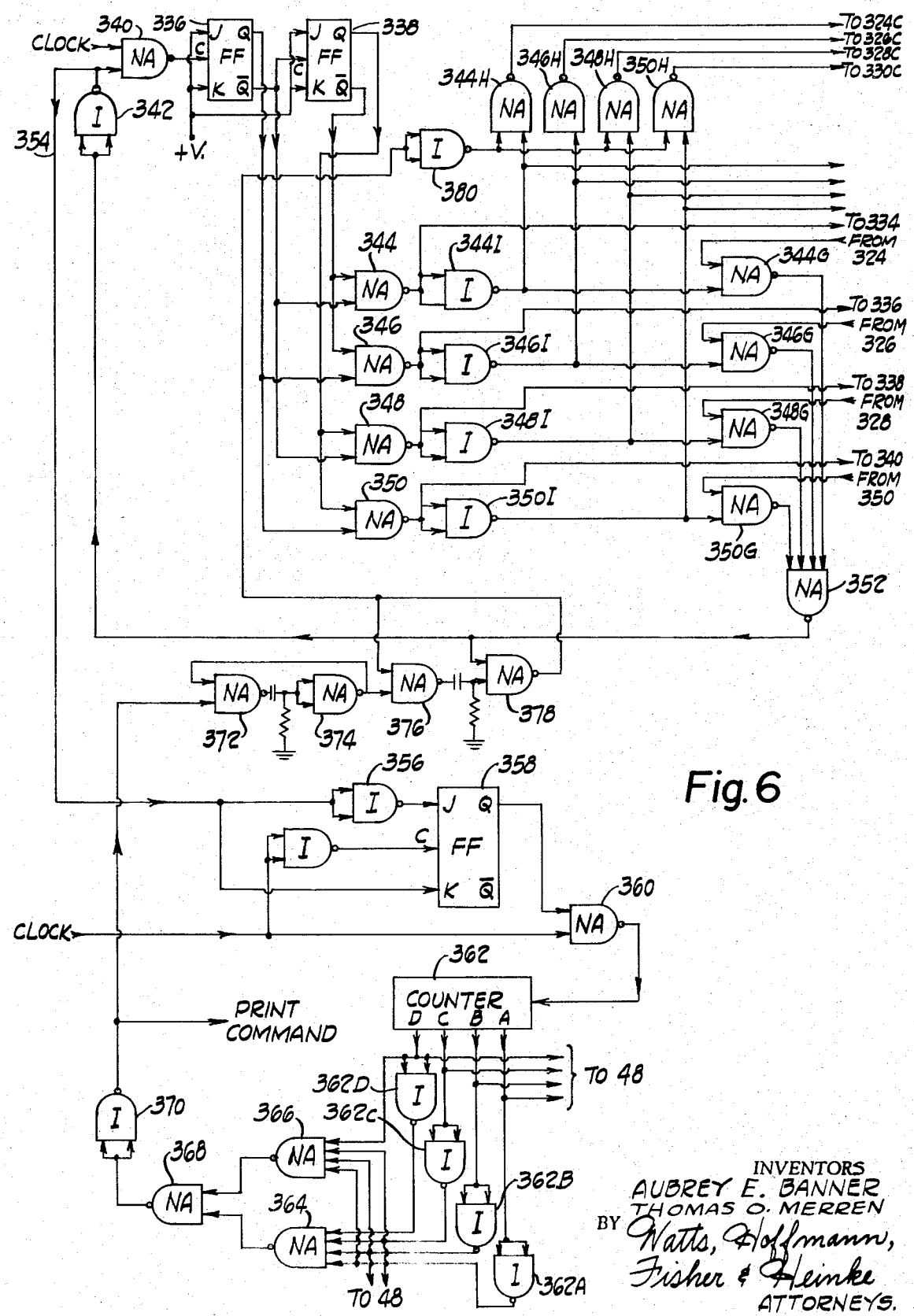
FIG. 6 is a diagram of the print circuitry embodied in the invention.

The various components comprising the printing circuitry are shown in logic diagram form in FIG. 6. Basically, the print control circuit comprises a simple binary counter similar to that previously described with respect to the write control circuitry 38 and embodying components of the same type, along with suitable decoding circuitry. The print control binary counter comprises a pair of flip-flops 336, 338. The J and K inputs of both of the flip-flops 336, 338 are connected to +V, and only the C input received pulses. The C input of the flip-flop 336 is connected to the output of a two-input NAND gate 340, which continually receives clock pulses. The $\bar{Q}$ output of the flip-flop 336 is connected to the C input of flip-flop 338. Thus, the flip-flops 336, 338 are capable of giving four individual count states. The clock pulses are gated into the flip-flop 336 by a signal present on the second input of the NAND gate 340. That signal is provided through an inventer 342 from the outputs of various gates in the print control circuit.

The decoding circuitry comprises four NAND gates 344, 346, 348 and 350, each of which NAND gate has two inputs. The Q output of the flip-flop 336 is connected to one input of each of the NAND gates 346, 350, and the $\bar{Q}$ output of that flip-flop is connected to one input of each of the other two NAND gates 344, 348. The Q output of the flip-flop 338 is connected to one input of each of the the NAND gates 348, 350 and the $\bar{Q}$ output of the flip-flop is connected to an input of each of the remaining NAND gates 344, 346.

The output of each of the NAND gates 344–350 is inverted by a corresponding inverter 344I–350I, whose output is applied to one input of a corresponding two-input NAND gate 344G–350G. The other input of each of the gates 344G–350G is provided from the direct or Q output of the corresponding flag flip-flop 324–330 in the write control circuitry shown in FIG. 5. If data is present in the corresponding register, the flag is up and the Q output of the corresponding flag flip-flop 324–330 is at logical "1." Thus, the output of the corresponding gate 344G–350G switches to logical "0."

The outputs of the gates 344G–350G are respectively connected to four inputs of a NAND gate 352. The output of the NAND gate 352 is provided through the inverter 342 previously mentioned to the second input of the NAND gate 340. Thus, if a flag is up and one of the NAND gates 344G–350G is at logical "0," the train of clock pulses to the flip-flop 336 through the NAND gate 340 is cut off and the counter remains in the state it has attained at that time.

Whenever one of the four gates 344G–350G switches to logical "0" on its output, indicating that the corresponding storage register selected by the counter contains data ready for printing out, the output of the NAND gate 352 switches to logical "1." This sets a logical "0" on the output of the inverter 342. This, in turn, by way of a lead 354 and another inverter 356 sets logical "1" and "0" states on J and K inputs, respectively, at a flip-flop 358. This sets a logic "1" on a Q or direct output of a flip-flop 358. The flip-flop 358 may be of the SN7470WN Type previously mentioned.

The Q output of the flip-flop 358 is connected to one input of a two-input NAND gate 360, the other input of which is connected to receive clock pulses.

The output of the NAND gate 360 is connected as input to a print cycle counter 362. The print cycle counter 362 governs the operation of printing out data from the buffer store onto recorder charge paper by means of a set of galvanometers (NOT SHOWN). Such galvanometers form part of the printout unit 48 shown in block form in FIG. 2.

The counter 362 provides four outputs A,B,C,D, respectively representing $2^0$, $2^1$, $2^2$ and $2^3$ which are respectively supplied to four inverters 362A, B, C & D. The outputs of the inverters 362A–D are supplied as four inputs to a NAND gate 364. The outputs of the inverters 362A–C are also supplied as three inputs to a NAND gate 366, whose fourth input is provided directly from the D output of the counter 362. The outputs of the NAND gates 364, 366 are provided as inputs to another NAND gate 368, whose output is inverted by an inverter 370. If galvanometers are not used in the print out, but some other method of printing out the data is used, such as the Visiprinter 50 or paper tape punch 52, a print command signal for those devices is obtained from the output of the inverter 370.

The print cycle counter 362 counts until it reaches a count state of 8 or until it reverts to zero after reaching 15. At that time, the NAND gate 364 or the NAND gate 366 goes to logic "0" at its output, thus causing the NAND gate 368 to switch to logic "1" on its output and the inverter 370 to switch to logical "0" on its output.

It is noted at this point that each of the NAND gates 344, 346, 348, 350 is connected through its corresponding inverter 344I–350I to one input of a corresponding two-input NAND gate 344H–350H. Thus, when a storage register is selected by the counter comprising the flip-flops 336, 338, the output of one of the NAND gates 344–350 will be at logical "0" and the output of the corresponding inverter 344I–350I has logical "1" on its output. In this condition, the other gates will be at logical "1," and their corresponding inverters will be at logical "0." Therefore, only one of the four gates 344H–350H will be enabled.

When the inverter 370 switches its output to logical "0," as previously described, it triggers two monostable circuits. The first monostable circuit comprises two NAND gates 372, 374, and the second monostable circuit comprises two more NAND gates 376, 378. When the inverter 370 switches its output to logical "0," it causes the output of the gate 378 to switch temporarily to logical "0." This causes the output of an inverter 380 connected to the output of the NAND gate 378 to switch temporarily to logical "1." Thus, the output of the enabled gate in the set of gates comprising gates 344H–350H switches to logical "0." This causes a corresponding gate 324C–330C in the print control circuitry to switch to logical "1," thus triggering the corresponding flag flip-flop 324–330. The conditions of the J and K inputs of the triggered flag flip-flop are such that it is reset to provide a logical "0" on its direct or Q output, i.e., the flag is put down after the data in its associated storage register has been printed out. The other flag flip-flops are reset in a similar way by way of their corresponding gates. The data in the storage register is not reset to logical "0," it is simply overwritten when new data appears. As the flag goes down, the output of the gate 352 switches to a logical "0," thus making the output of the gate 378 go immediately to logical "1" and override the effect of the monostable circuit comprising the gates 376, 378.

If the register selected for the print-out happens to be that corresponding to count state "0" in the counter comprising flip-flops 336, 338, then the output of the gate 344 is logical "0," and this is applied to one of the inputs of the gate 334 in the write control circuitry. Thus, the output of the inverter 334I is logical "0," which inhibits the gate 314. The action is similar for the other registers. Thus, while the print control counter flip-flops 336, 338 are selecting a given register, it is impossible to write new data to that register even though the flag may have just been put down. This is a very necessary condition in order to avoid "queue-jumping."

It has just been shown that as the flag of the selected flag flip-flop 324–330 corresponding to a selected storage register is reset to logical "0" on its Q output after printing out of data, the output of the gate 352 in the print control circuitry switches to logical "0." This causes the output of the inverter 342 to switch to logical "1." Thus, the J and K inputs of the flip-flops 358 are put in logical "0" and logical "1" conditions, respectively. This occurs very shortly after the print cycle counter 362 reaches a count state of 0 or 8, because the time taken to reset the flag flip-flop 324–330 corresponding to any one of the storage registers is only a matter of a few tenths of a nanosecond. Since the print cycle counter 362 is clocked by positive-going edges of the clock pulses, the J and K inputs of the flip-flop 358 are set to their appropriate levels well before the next negative-going edge from the clock which, therefore, clocks the flip-flop 358 to give a logical "0" on its direct or Q output. This output inhibits the gate 360, which then prevents further trigger pulses from reaching the print cycle counter 362. Thus, the print cycle counter remains at the count state of 0 or 8 until the next register containing data is selected and the flip-flop 358 is consequently set to logical "1" on its Q output, and the complete printing cycle is repeated.

Figure 7:
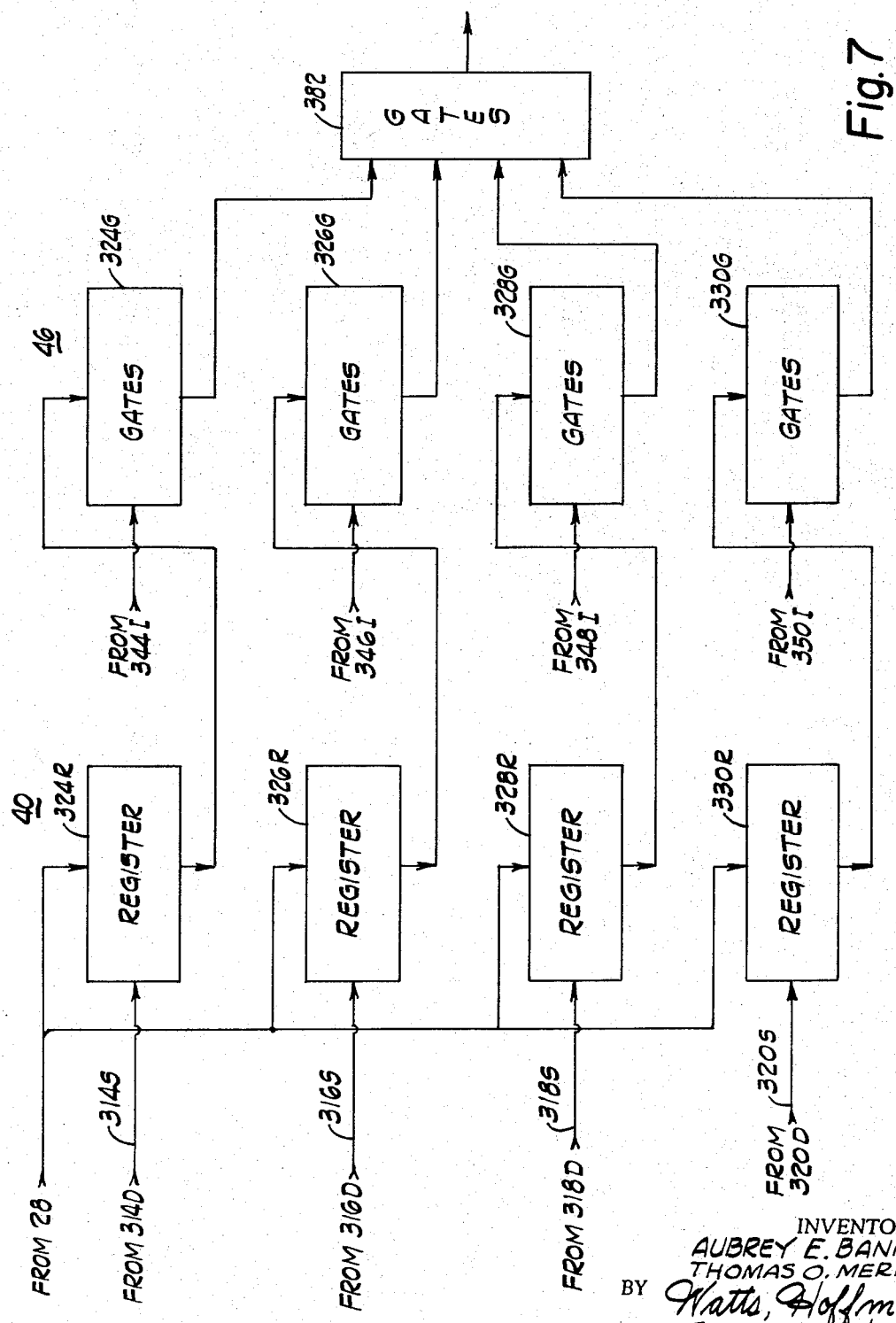
FIG. 7 is a block diagram illustrating an arrangement of storage registers and gates applicable to the system of the invention.

FIG. 7 illustrates diagrammatically the storage registers comprising the buffer store 40 and the print gate 46. Storage registers 324R–330R corresponding to the flag flip-flops 324–330 in the write control circuitry (FIG. 5) all receive input data from the subtractor 28. The registers 324R–330R also receive strobe signals from the flip-flops 314D–320D, respectively, on the leads 314S–320S, respectively. Each of the registers 324R–330R provides output signals to a corresponding gate 324G–330G, which gates also receive respective signals from the inverters 344I–350I in the print control circuitry. The signals from the inverters 344I–350I enable a proper one of the gates 324G–330G to pass data from a corresponding register 324R–330R to output NAND gates shown diagrammatically as a block 382. The output of the gates 382 is provided to one of the various printout devices selected for use.

The registers and gates shown in FIG. 7 are all conventional components, whose construction is well-known in the art. For specific circuitry, reference is again made to the book entitled, "Pulse, and Switching Waveforms."

Figure 8:
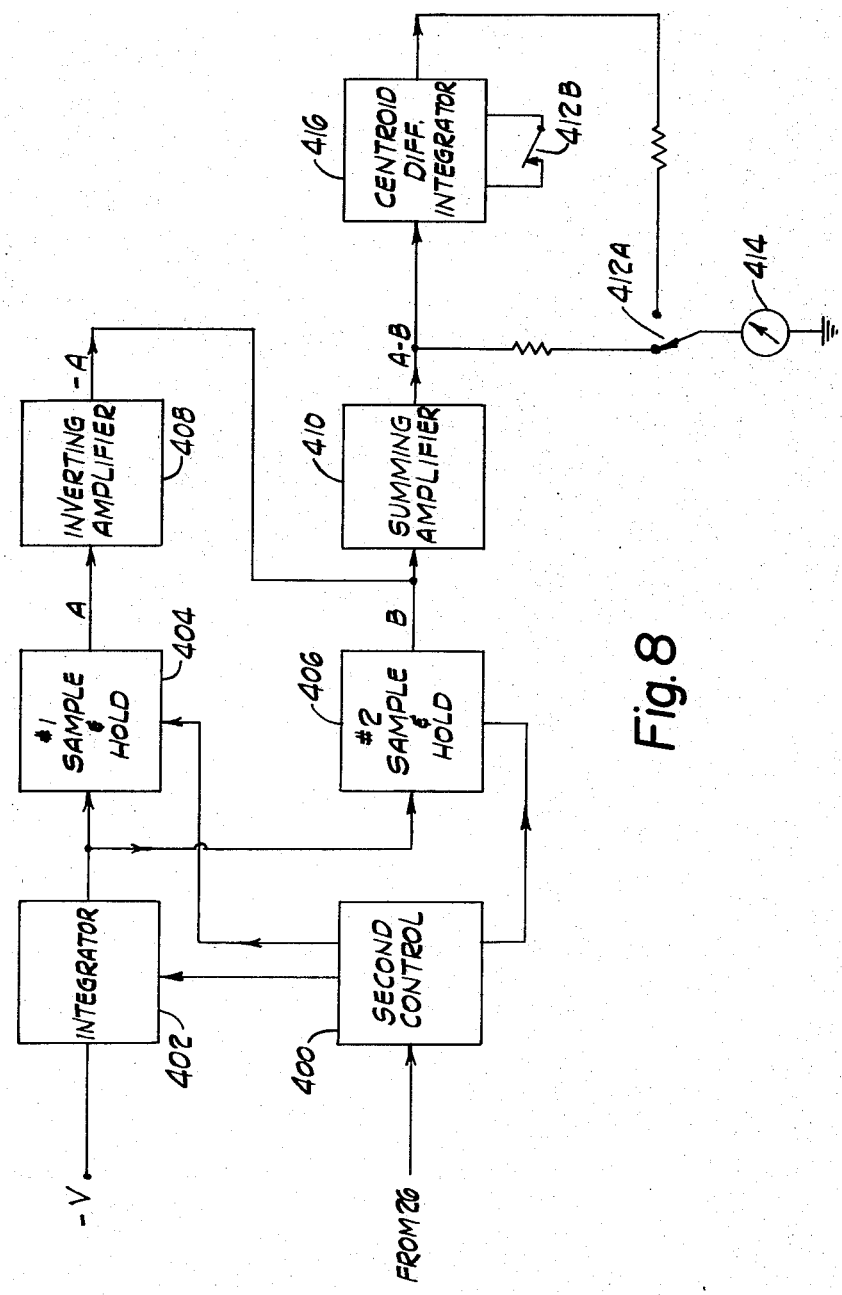
FIG. 8 is a block diagram of another embodiment of the invention.

FIG. 8 illustrates in block diagram form a modified version of circuitry embodying the invention. Thus far, special reference has been given to the determination of peak centroid times obtained from scans of a mass spectrometer, covering an extensive range of mass, for the purpose of obtaining information from which the accurate masses of a sample molecular and fragment ions may be calculated. However, accurate mass measurements can also be made by the well-known technique of peak matching. By this method, an unknown peak of interest and a reference peak of accurately known mass are alternately displayed on a medium-persistence oscilloscope by switching the electrostatic analyzer of the spectrometer and accelerating voltages of the mass spectrometer between the appropriate values for the two peaks in question. For each voltage condition, a small scan is made with an auxiliary magnet field scanning coil, in order to sweep through the peak concerned, and so to display it on the oscilloscope. An operator adjusts the voltages by means of a set of decade dials until the two peaks appear to be in exact coincidence on the oscilloscope screen. The decade dial settings then give the ratio of the masses of the two peaks, from which the unknown mass can be calculated. Reasonable accuracy can be obtained with this method, but the method can be difficult to practice because of noise on the peaks and drift in the mass spectrometer field.

Certain of these difficulties may be overcome by using portions of the mass measurement system already described to measure the peak centroids of the two peaks being matched. The two output signals representing the peak centroids may be turned into analog voltages by means of additional apparatus shown in FIG. 8, which enables the peak matching process to be finally observed on a meter rather than on an oscilloscope. The decade dials are then adjusted to give a null deflection on the meter, and the mass ratio may then be obtained from the decade dials as previously mentioned.

The necessary circuitry to perform peak matching using peak centroids consists of the double integrator 24, the control circuitry 22 (including the threshold detector), the crystal controlled clock 30, and the dividing means 26, all of which are shown in FIG. 2, together with certain additional circuitry shown in FIG. 8. The test display 58 is also required for set-up purposes.

In the peak matching mode of operation, the mass spectrometer peak output signal is applied through the control circuitry 22 to the input of the double integrator 24 as described with reference to FIG. 2. However, this signal is no longer connected to the threshold detector in the control circuitry 22. Instead, the threshold detector is now driven by a rectangular output voltage pulse derived from a small magnet field scan which sweeps alternately through the sample and reference peaks. This voltage must be at logical "0" level when the small magnet scan is not in operation, and at a logical "1" level the magnet scan is in operation. Thus, when the small scan commences, the threshold detector in the control circuitry 22 is immediately operated, and thus causes the double integrator circuit 24 to commence integration. This proceeds until the small scan ends, when the threshold detector returns to its normal condition, and causes the double integrator 24 to cease integration. The appropriate channel is selected, as before, the dividing means 26 produces an output time interval, which is proportional to the time between the centroid of the peak and the end of the small magnet scan. This is done for the sample and reference alternately. A pulse is derived concurrently from the control circuitry 22, the width of which is equal to the time interval produced by the dividing means 26. This pulse is applied to a second control circuit 400 shown in FIG. 8. The output of the second control circuit 400 actuates an integrator 402 and allows integration to be performed for the duration of the input pulse to the second control circuit. The input to the integrator 402 is a constant voltage −V, so that the output of the integrator increases linearly with time. Thus, the final value of the output of the integrator 402 at the end of the pulse is proportional to the time interval produced by the dividing means 26 (FIG. 2) and is, therefore, a measure of the time between the peak centroid and the end of the small magnet scan.

The final values of the integrator output are sampled and stored by first and second sample-and-hold circuits 404, 406 alternately, under the control of the second control circuit 400.

The centroid time of an unknown sample peak A, for example, may be stored by the first sample-and-hold circuit 404, and that of a reference peak B may be stored by the second sample-and-hold circuit 406. The output voltage A is inverted by a unity gain amplifier 408 to give an output voltage −A, which is then algebraically added to the output voltage B by means of a summing amplifier 410. The output of the summing amplifier 410 is then a voltage proportional to (A − B). This output voltage may be connected through a switch 412A to a suitable meter 414, which, in general, will be deflected from a center-zero position, which indicates a mismatch between any pair of successive peaks. An operator then adjusts the decade dials to reduce the meter deflection to a null, as closely as possible. The ratio between the unknown and reference masses is then given by the decade settings, and the unknown mass can be calculated.

Any drift in the mass spectrometer could cause some difficulty in the matching, and it is therefore advantageous to examine the two peaks in question several times to average the results. This may be done automatically by putting the switch 412A into a second position, wherein the meter displays the output of a centroid difference integrator 416. The integrator is normally held in a reset condition by means of a second pole 412B on the switch, but in the second position of the switch it is allowed to integrate the output of the summing amplifier 410.

Such an integration is allowed to proceed for several successive pairs of scans of the two peaks, and so the output of the centroid difference integrator 416 is an average of the successive differences in peak centroid times. The decade dials are then adjusted by the operator to give a minimum integration output by the integrator 416 for a suitable given number of scans through the pair of sample and reference peaks. The accurate mass of the sample peak is then calibrated in the usual way.

Although certain embodiments of the invention have been described and shown, it is understood that various changes may be made by one skilled in the art without departing from the true spirit and scope of the invention.

I claim:

1. In a system for determining mass of an ion in a scanning mass spectrometer by determining time of occurrence of a centroid of an output peak signal due to said ion with respect to time of occurrence of termination of said peak signal, the combination comprising:
   a. first integrating means for integrating said peak signal to obtain a first integral signal;
   b. second integrating means for integrating said first integral signal to obtain a second integral signal;
   c. dividing means for dividing said second integral signal by said first integral signal to provide a time signal proportional to the time of occurrence of said centroid relative to said time of occurrence of said termination of said peak signal.
   d. threshold detecting means for obtaining a termination signal indicating said termination of said peak signal; and,
   e. subtracting means for subtracting the value of said time signal from the value of said termination signal to obtain a signal having a value representative of said time of occurrance of said centroid.

2. The combination of claim 1, further including means for developing said first and second integral signals only during the period of time that the amplitude of said peak signal exceeds a threshold amplitude.

3. The combination of claim 2, wherein said first and second integrating means each comprise a like plurality of channels having different sensitivities.

4. The combination of claim 3, further including channel selector means responsive to amplitude of said output signal of said mass spectrometer for applying said output peak signal to a selected one of said channels of said first integrating means and a selected one of said channels of second integrating means.

5. The combination of claim 1, wherein said first and second integrating means each comprises comprise like plurality of channels having different sensitivities.

6. The combination of claim 5, further including channel selector means responsive to amplitude of said output signal of said mass spectrometer for applying said output peak signal to a selected one of said channels of said first integrating means and a selected one of said channels of second integrating means.

7. The combination of claim 1, wherein said dividing means includes a counter for providing said signal representative of a period of time.

8. The combination of claim 7 wherein said dividing means includes an integrator and a comparator for receiving said first and second integral signals for providing to said counter a signal having a time duration representative of said second integral signal divided by said first integral signal.

9. The combination of claim 8, wherein said integrator receives and integrates said first integral signal to provide a third integral signal and said comparator receives said second and third integral signals and causes termination of said counter when said third integral signal equals said second integral signal.

10. The combination of claim 1, further including recording means for recording said signals representative of said time of occurrence of said centroid.

11. The combination of claim 2, wherein said dividing means includes a counter for providing said signal representative of a period of time.

12. The combination of claim 11 wherein said dividing means includes an integrator and a comparator for receiving said first and second integral signals for providing to said counter a signal having a time duration representative of said second integral signal divided by said first integral signal.

13. The combination of claim 12, wherein said integrator receives and integrates said first integral signal to provide a third integral signal and said comparator receives said second and third integral signals and causes termination of said counter when said third integral signal equals said second integral signal.

14. A system for determining occurrence time of a time/amplitude centroid of a pulse signal having an amplitude above a threshold amplitude for a period of time comprising:
   a. first integrating means for integrating said pulse signal while its amplitude exceeds said threshold amplitude to provide a first integral signal;
   b. second integrating means for integrating said first integral signal while said amplitude of said waveform exceeds said threshold amplitude to provide a second integral signal;
   c. dividing means actuated after the amplitude of said pulse signal decreases to a value less than said threshold amplitude for dividing said second integral signal by said first integral signal to provide a signal representative of a period of time; and,
   d. subtracting means for subtracting said signal representative of a period of time from a signal representative of the time at which integration ceased due to amplitude of said waveform falling below said threshold amplitude to provide an output signal representative of the time of occurrence of the centroid.

15. In a system for determining mass of an ion in a scanning mass spectrometer by determining time of occurrence of a centroid of an output peak signal due to said ion with respect to time of occurrence of termination of said peak signal, the combination comprising:
   a. first integrating means including a plurality of channels having different sensitivities for integrating said peak signal to obtain a first integral signal;
   b. second integrating means including a plurality of channels having different sensitivities for integrating said first integral signal and to obtain a second integral signal;
   c. dividing means for dividing said second integral signal by said first integral signal to provide a time signal proportional to the time of occurrence of said centroid relative to said time of occurrence of said termination of said peak signal.

16. The combination of claim 15, further including channel selector means responsive to the amplitude of said output peak signal of said mass spectrometer for applying said output peak signal to a selected one of said channels of said first integrating means and a selected one of said channels of said second integrating means.

17. The combination of claim 16, wherein said dividing means includes a counter for providing said signal representative of a period of time.

18. The combination of claim 17 wherein said dividing means includes an integrator and a comparator for receiving said first and second integral signals for providing to said counter a signal having a time duration representative of said second integral signal dividied by said first integral signal.

19. The combination of claim 18, wherein said integrator receives and integrates said first integral signal to provide a third integral signal and said comparator receives said second and third integral signals and causes termination of said counter when said third integral signal equals said second integral signal.

20. The combination of claim 15, wherein said dividing means includes a counter for providing said signal representative of a period of time.

21. The combination of claim 20 wherein said dividing means includes an integrator and a comparator for receiving said first and second integral signals for providing to said counter a signal having a time duration representative of said second integral signal divided by said first integral signal.

22. The combination of claim 21, wherein said integrator receives and integrates said first integral signal to provide a third integral signal and said comparator receives said second and third integral signals and causes termination of said counter when said third integral signal equals said second integral signal.

23. In a system for determining mass of an ion in a scanning mass spectrometer by determining time of occurrence of a centroid of an output peak signal due to said ion with respect to time of occurrence of termination of said peak signal, the combination comprising:
   a. first integrating means for integrating said peak signal to obtain a first integral signal;
   b. second integrating means for integrating said first integral signal to obtain a second integral signal; and,
   c. means for responsive to said first and second integral signals for generating a signal indicative of time of occurrence of said centroid relative to time of occurrence of termination of said peak signal, said means including a counter for providing said signal indicative of a period of time.

24. The combination of claim 23 wherein said means responsive to said first and second integral signals includes circuit means providing to said counter a signal having a time duration representative of said second integral signal divided by said first integral signal.

25. The combination of claim 24, wherein said circuit means includes integrator means for receiving and integrating said first integral signal to provide a third integral signal, and comparator means for receiving said second and third integral signals and causing termination of said counter when said third integral signal equals said second integral signal.

26. In a method of determining mass of an ion in a scanning mass spectrometer by determining time of occurrence of a centroid of an output peak signal due to said ion with respect to time of occurrence of termination of said peak signal, the steps of:

a. integrating said peak signal to obtain a first integral signal;
b. integrating said first integral signal to obtain a second integral signal;
c. dividing said second integral signal by said first integral signal to obtain a signal having a value which is representative of the time of occurrence of said centroid relative to said time of occurrence of said termination of said peak signal; and,
d. obtaining a termination signal indicating said termination of said peak signal, and subtracting said time representative signal from said termination signal to obtain a signal having a value representative of the time of occurrence of said centroid.

27. The method set forth in claim 26, wherein the integrations are performed only while the amplitude of said peak signal exceeds a predetermined threshold amplitude.

28. A method of determining the time of occurrence of a time/amplitude centroid of a pulse signal having an amplitude above a threshold amplitude for a period of time comprising the steps of:
   a. integrating said pulse signal while its amplitude exceeds said threshold amplitude to provide a first integral signal;
   b. integrating said first integral signal while the amplitude of the pulse signal exceeds said threshold amplitude to provide a second integral;
   c. dividing said second integral signal by said first integral signal after the amplitude of said pulse signal falls below said threshold amplitude to provide a signal representative of a period of time; and,
   d. subtracting said time representative signal from a signal representative of the time at which integration ceased due to amplitude of said pulse signal falling below said threshold amplitude to provide an output signal representative of the time of occurrence of the centroid.

29. A method of peak matching with a mass spectrometer comprising the steps of:
   a. establishing a field with an analyzer of the mass spectrometer;
   b. adjusting the level of the analyzer field such that ions of a first mass number are directed substantially toward an ion collector;
   c. scanning the level of the analyzer field over a range necessary to cause the waveform of a first output signal developed by the ion collector resulting from the ions striking the collector to take the form of a signal which increases in value for a given interval of time and decreases in value for a given interval of time to thereby define a peak amplitude;
   d. integrating said output signal during the scanning of the analyzer field to provide a first integral signal;
   e. integrating said first integral signal during the scanning of the analyzer field to provide a second integral signal;
   f. dividing said second integral signal by said first integral signal to provide a signal having a value representative of the elapsed time between the time of occurrence of a centroid of said first ion collector output signal and the termination of the scanning;

g. adjusting the level of the analyzer field such that ions of a second mass number are directed substantially toward the ion collector;

h. scanning the level of the analyzer field over a range necessary to cause the waveform of a second output signal developed by the ion collector resulting from the ions striking the collector to take the form of a signal which increases in value for a given interval of time and decreases in value for a given interval of time to thereby define a peak amplitude;

i. integrating said second output signal during the second scanning of the analyzer field to provide a third integral signal;

j. integrating said third integral signal during the second scanning of the analyzer field to provide a fourth integral signal;

k. dividing said fourth integral signal by said third integral signal to provide another signal having a value representative of the elapsed time between the time of occurrence of a centroid of said second ion collector output signal and the termination of the second scanning; and, l. subtracting the value of one of said elapsed time representative signals from the value of the other elapsed time representative signal to provide a comparison signal representative of the relative positions of the signal peaks.

30. The method as defined in claim 29 including the steps of:

a. changing the level of the analyzer field to a different value which also causes the ions of the first mass number to be directed substantially toward the ion collector; and, b. repeating the steps of c) through f), and h) through l) of claim 29.

31. The method as defined in claim 29 including the steps of a. changing the level of the analyzer field to a different value which also causes the ions of the second mass number to be directed substantially toward the ion collector; and, b. repeating the steps of b) through f), and h) through l) of claim 29.

32. A method of peak matching with a mass spectrometer comprising the steps of:

a. establishing a field with an analyzer of the mass spectrometer;

b. adjusting the level of the analyzer field such that ions of a first mass number are directed substantially toward an ion collector;

c. scanning the level of the analyzer field over a range necessary to cause the waveform of a first output signal developed by the ion collector resulting from the ions striking the collector to take the form of a signal which increases in value for a given interval of time and decreases in value for a given interval of time to thereby define a peak amplitude;

d. integrating said output signal during the scanning of the analyzer field to provide a first integral signal;

e. integrating said first integral signal during the scanning of the analyzer field to provide a second integral signal;

f. dividing said second integral signal by said first integral signal to provide a signal having a value representative of the elapsed time between the time of occurrence of a centroid of said first ion collector output signal and the termination of the scanning;

g. adjusting the level of the analyzer field such that ions of a second mass number are directed substantially toward the ion collector;

h. scanning the level of the analyzer field over a range necessary to cause the waveform of a second output signal developed by the ion collector resulting from the ions striking the collector to take the form of a signal which increases in value for a given interval of time and decreases in value for a given interval of time to thereby define a peak amplitude;

i. integrating said second output signal during the second scanning of the analyzer field to provide a third integral signal;

j. integrating said third integral signal during the second scanning of the analyzer field to provide a fourth integral signal;

k. dividing said fourth integral signal by said third integral signal to provide another signal having a value representative of the elapsed time between the time of occurrence of a centroid of said second ion collector output signal and the termination of the second scanning;

l. subtracting the value of one of said elapsed time representative signals from the value of the other elapsed time representative signal to provide a comparison signal representative of the relative positions of the signal peaks;

m. changing the level of the analyzer field to a different value which also causes the ions of the first mass number to be directed substantially toward the ion collector; and, n. repeating the steps of c) through f) and h) through l) until the value of the comparison signal equals substantially zero.

33. The method as defined in claim 32 including the steps of:

a. changing the level of the analyzer field to a different value which also causes the ions of the second mass number to be directed substantially toward the ion collector; and, b. repeating the steps of b) through f) and h) through l) of claim 32.

34. A method of peak matching with a mass spectrometer comprising the steps of:

a. establishing a magnetic field with a magnetic analyzer of the mass spectrometer;

b. adjusting the level of the magnetic field such that ions of a first mass number are directed substantially toward an ion collector;

c. scanning the magnetic field over a range necessary to cause the waveform of a first output signal developed by the ion collector resulting from the ions striking the collector to take the form of a signal which increases in value for a given interval of time and decreases in value for a given interval of time to thereby define a peak amplitude;

d. integrating said output signal during the scanning of the magnetic field to provide a first integral signal;

e. integrating said first integral signal during the scanning of the magnetic field to provide a second integral signal;
f. dividing said second integral signal by said first integral signal to provide a signal having a value representative of the elapsed time between the time of occurrence of a centroid of said first ion collector output signal and the termination of the scanning;
g. adjusting the level of the magnetic field such that ions of a second mass number are directed substantially toward the ion collector;
h. scanning the magnetic field over a range necessary to cause the waveform of a second output signal developed by the ion collector resulting from the ions striking the collector to take the form of a signal which increases in value for a given interval of time and decreases in value for a given interval of time to thereby define a peak amplitude;
i. integrating said second output signal during the second scanning of the analyzer field to provide a third integral signal;
j. integrating said third integral signal during the second scanning of the analyzer field to provide a fourth integral signal;
k. dividing said fourth integral signal by said third integral signal to provide another signal having a value representative of the elapsed time between the time of occurrence of a centroid of said second ion collector output signal and the termination of the second scanning; and,
l. subtracting the value of one of said elapsed time representative signals from the value of the other elapsed time representative signal to provide a comparison signal representative of the relative positions of the signal peaks.

35. The method as defined in claim 34, including the steps of:
a. changing the level of the magnetic field to a different value which also causes the ions of the first mass number to be directed substantially toward the ion collector; and
b. repeating the steps of c) through f), and h) through l) of claim 34.

36. The method as defined in claim 34 including the steps of:
a. changing the level of the magnetic field to a different value which also causes the ions of the second mass number to be directed substantially toward the ion collector; and,
b. repeating the steps of b) through f), and h) through l) of claim 34.

* * * * *